(12) United States Patent
Park et al.

(10) Patent No.: US 12,498,897 B2
(45) Date of Patent: Dec. 16, 2025

(54) DASHBOARD USER INTERFACE

(71) Applicant: Sonos, Inc., Santa Barbara, CA (US)

(72) Inventors: Sangah Park, Sommerville, MA (US); Briana Lee, Venice, CA (US); Jai Sawkar, New York, NY (US); Robert A. Lambourne, Santa Barbara, CA (US)

(73) Assignee: SONOS, INC., Goleta, CA (US)

( * ) Notice: Subject to any disclaimer, the term of this patent is extended or adjusted under 35 U.S.C. 154(b) by 0 days.

(21) Appl. No.: 18/430,160

(22) Filed: Feb. 1, 2024

(65) Prior Publication Data

US 2024/0264794 A1    Aug. 8, 2024

Related U.S. Application Data

(60) Provisional application No. 63/459,909, filed on Apr. 17, 2023, provisional application No. 63/443,636, filed on Feb. 6, 2023.

(51) Int. Cl.
*G06F 3/16*    (2006.01)

(52) U.S. Cl.
CPC .................. *G06F 3/162* (2013.01)

(58) Field of Classification Search
CPC ....................................... G06F 3/162
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Alexander Krzystan
*Assistant Examiner* — Tyler Michael Liebgott
(74) *Attorney, Agent, or Firm* — Workman Nydegger

(57) ABSTRACT

A computer system for executing a controller interface displays a visual representation of one or more media playback systems. The one or more media playback systems are located in different locations. At least a portion of the one or more playback systems comprise multiple playback devices. The computer system displays a schedule interface that displays options for scheduling particular rooms within particular locations to play particular audio content.

17 Claims, 56 Drawing Sheets

(56) References Cited

U.S. PATENT DOCUMENTS

| | | | |
|---|---|---|---|
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 * | 8/2009 | Lambourne | G06F 3/165 700/94 |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 * | 7/2011 | Bryce | H04R 3/12 709/248 |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 * | 7/2013 | Lambourne | G06F 3/16 709/217 |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0142944 A1 | 6/2007 | Goldberg et al. | |
| 2010/0299639 A1 * | 11/2010 | Ramsay | H04L 41/22 715/835 |
| 2014/0304756 A1 * | 10/2014 | Fletcher | H04N 21/26258 725/115 |
| 2017/0242653 A1 * | 8/2017 | Lang | H04W 8/005 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

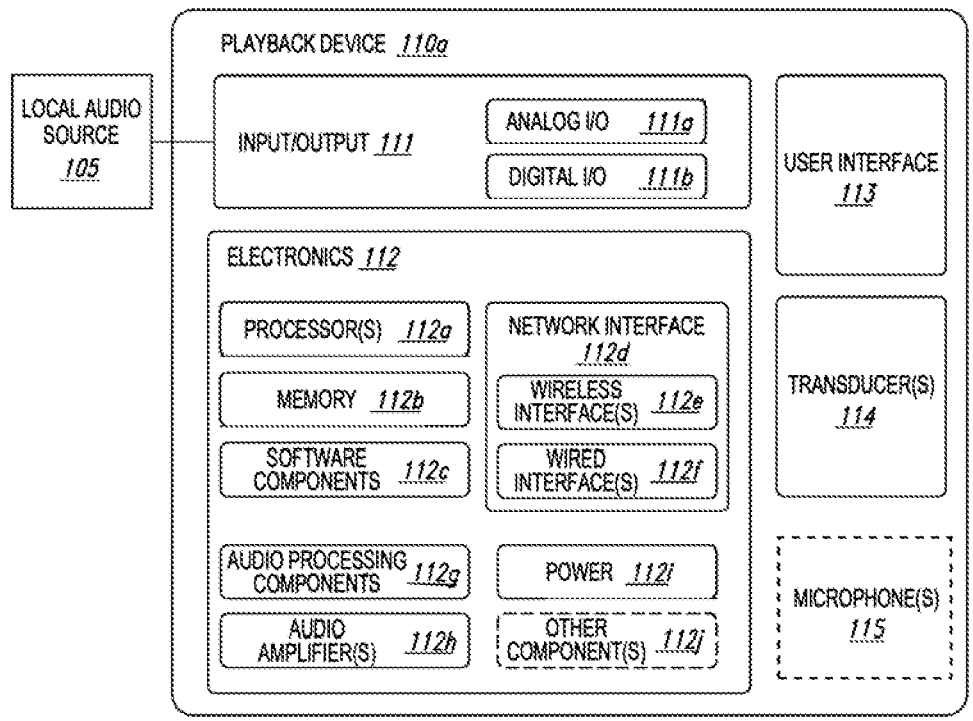
FIG. 1C
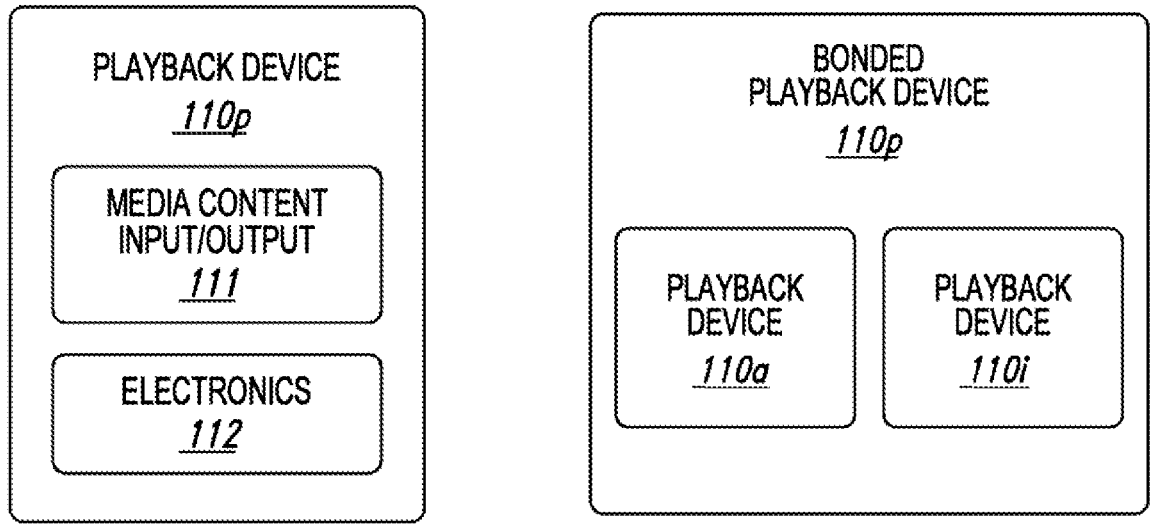
FIG. 1D  FIG. 1E

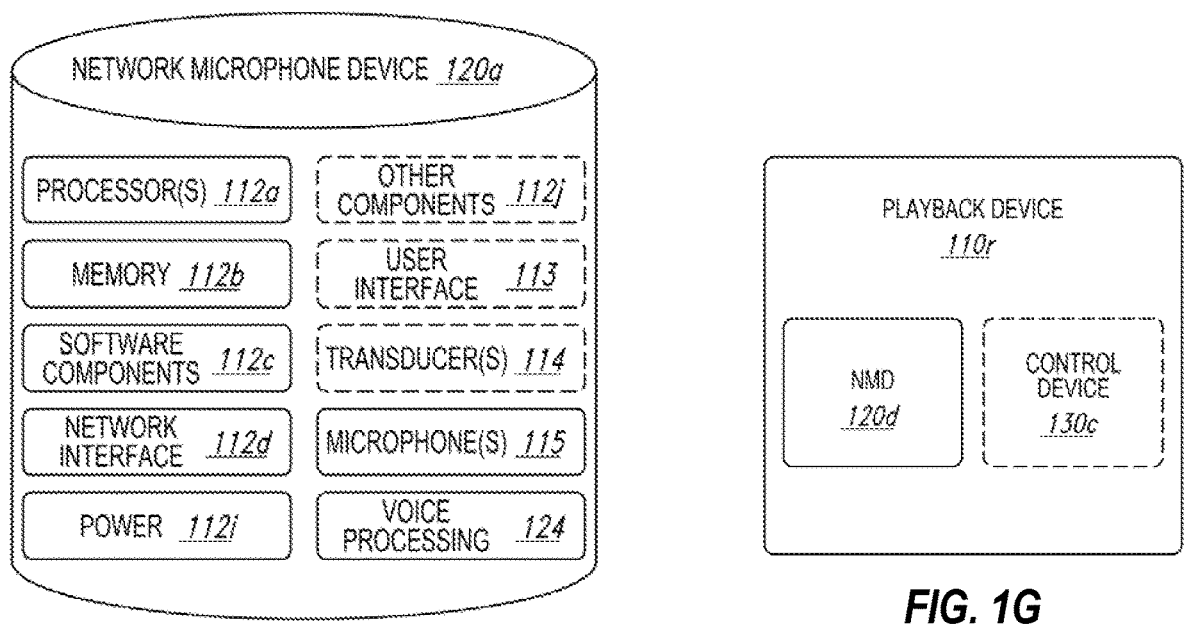
FIG. 1F
FIG. 1G
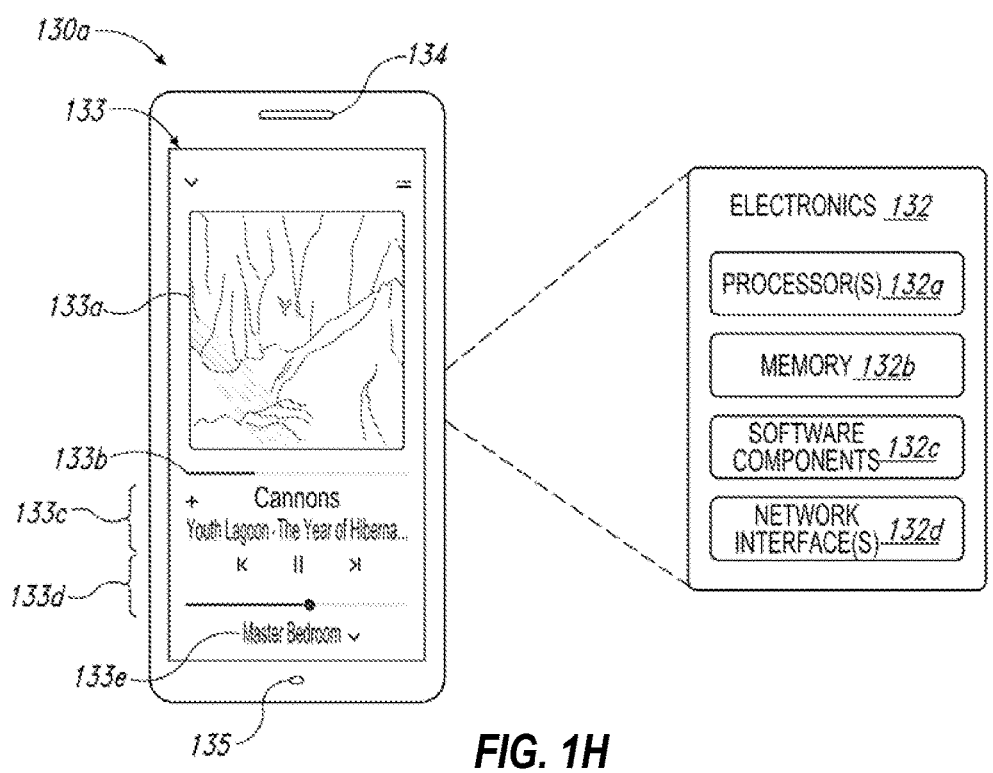
FIG. 1H

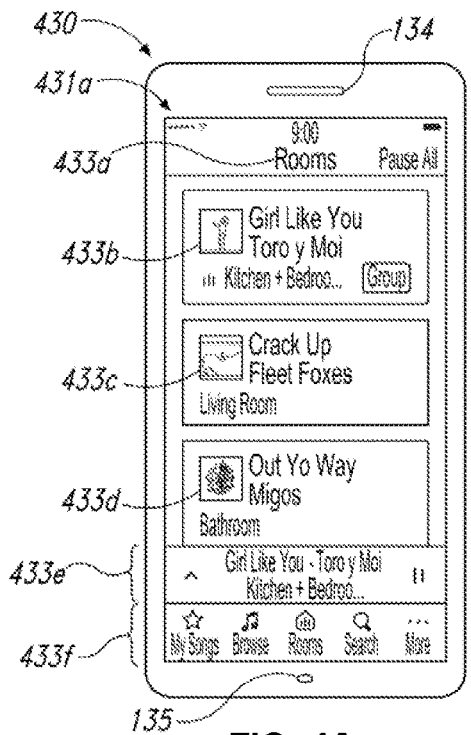
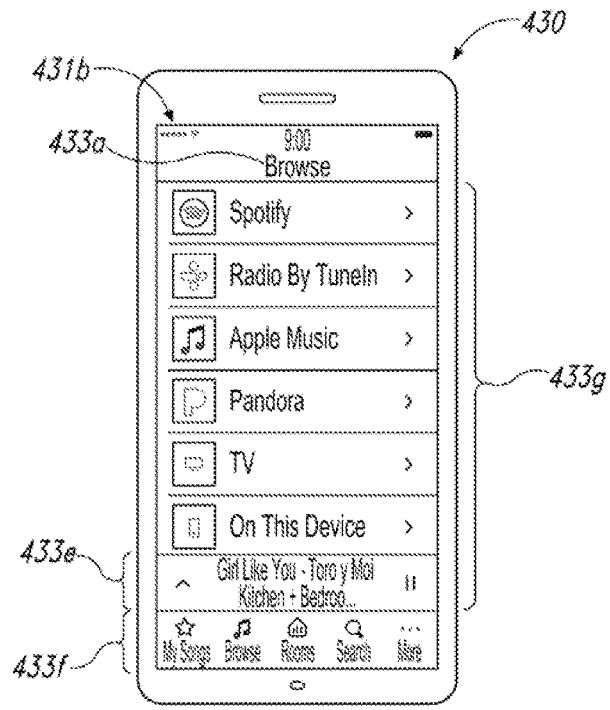
FIG. 4A
FIG. 4B
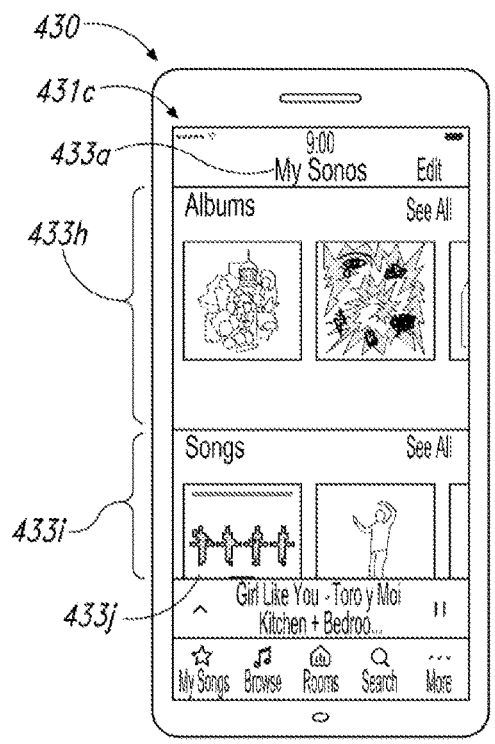
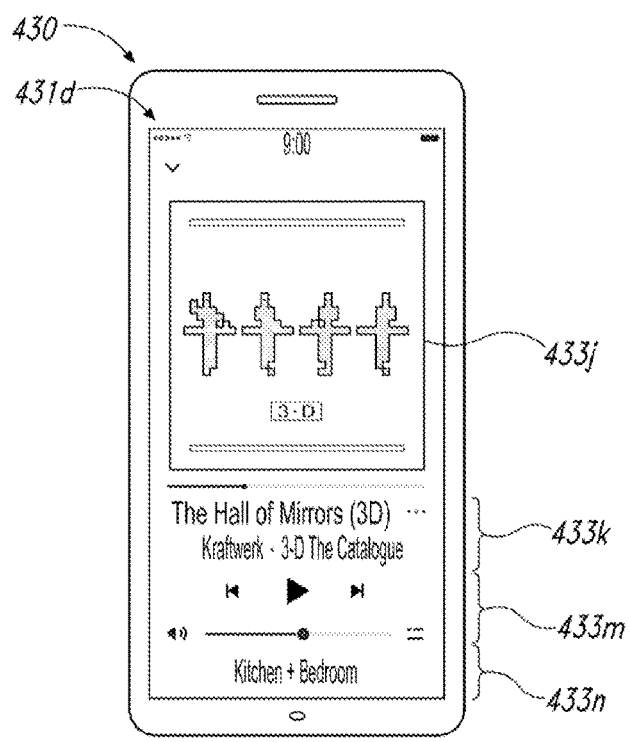
FIG. 4C
FIG. 4D

FIG. 10

Overview   Music   Users   Settings   User Guide

John Doe  [Company |∨]

Getting started

Software tools

There are two kinds of tools you can use to control Sonos Business systems.

Sonos app

The Sonos app is used on-site to set up and maintain the system at each location, including the music that can be played there.

Dashboard

Administrators with multiple systems can view activity across all locations. You can also share content between systems or edit the content that will be played at a location.

- Getting started
- Software tools
- User roles
- Review existing content
- Locations
- Music and services
- Add services
- Add content
- Play music
- Schedules
- Schedule from System
- Schedule from Settings
- Settings
- Set volume limit
- Disable touch controls
- Filter explicit content
- Keep your system up to date
- Global settings
- Support
- Proactive support (optional)

*FIG. 12A*

Overview   Music   Users   Settings

John Doe
Company I

Subscription

Help Guide
Support
Sign Out

Getting started

Software tools

There are two kinds of tools you can use to control

Sonos app

The Sonos app is used on-site to set up and maintain
including the music that can be played there.

Dashboard

Administrators with multiple systems can view activ
share content between systems or edit the content

- Getting started
- Software tools
- User roles
- Review existing content
- Locations
- Music and services
- Add services
- Add content
- Play music
- Schedules
- Schedule from System
- Schedule from Settings
- Settings
- Set volume limit
- Disable touch controls
- Filter explicit content
- Keep you system up to date
- Global settings
- Support
- Proactive support (optional)

*FIG. 14*

< Subscription Management ✕

Started on 5/25/21
Sonos Business

Billed Systems
10

Subscription Owner
Business Owner
businessowner@email.com

Next Billing Date
July 1, 2021 / Monthly

---

Sonos Private Preview

Billing Breakdown
Last Updated: 8/5/2022

```
Free with Sonos Private Preview
Cost per System    System   =  Monthly Subtotal
$0.00              x 10        $0.00
$XXX.XX                         $XXX.XX
```

Thank you for being a Sonos Private Preview Member. Your current experience has no charge! We will notify you X days before we request billing information from you.

If you have any questions, please contact your Customer Success Manager.

Cancellation

To cancel your subscription, please contact your Customer Success Manager for more information.

More Help

🔗 Report Inaccurate system count
🔗 Frequently Asked Questions
   Q What does systems mean?
   Q How do I remove a system to my subscription?
   Q How do I add a new system to my subscription?
🔗 Quick Start Guide 700g

Add a Schedule

Location 3

Select Product
8:00 am • Daily
Select Music

Product   Time   Music

● Include Grouped Products

○ Room 1, Room 2
○ Room 3
○ Room 4

25%

Save

Add a Schedule

Location 3

Room 1, Room 2
8:00 am • Daily
Select Music

Product   Time   Music

Start Time

8:00 am

Duration 6 hours  0 min

Add a Schedule

Location 3
Location 1
Location 2
Location 3
Location 4
Location 5
Location 6
Location 7
Location 8
Location 9
Location 10

Save

Import Favorites

1. ● Select system ② Choose content

Select a system to import content from.

| | | |
|---|---|---|
| ○ Location 1 | No Favorites | > |
| ○ Location 2 | Needs update | > |
| ○ Location 4 | | > |
| ○ Location 5 | | > |
| ○ Location 6 | | > |
| ○ Location 7 | | > |
| ○ Location 8 | | > |
| ○ Location 9 | | |

700s

X

Next

*FIG. 27*

Import Favorites

① Select system  ② Choose content

Select content from Location 4 to add to Location 3.

○ Select all (7)

Stations

| | | |
|---|---|---|
| ○ | Playlist 8 | Service4 |
| ○ | Playlist 8 | Service3 |
| ○ | Playlist 8 | Service1 |
| ○ | Playlist 8 | Service5 |
| ○ | Playlist 8 | Service2 |
| ○ | Playlist 8 | Service3 |
| ○ | Playlist 8 | Service1 |

Shortcut to Folder

○ 🗂 Cafe                    Service1

( Finish )

Back

*FIG. 28*

DASHBOARD USER INTERFACE

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C is a block diagram of a playback device.

FIG. 1D is a block diagram of a playback device.

FIG. 1E is a block diagram of a network microphone device.

FIG. 1F is a block diagram of a network microphone device.

FIG. 1G is a block diagram of a playback device.

FIG. 1H is a partial schematic diagram of a control device.

FIGS. 4A-4D are schematic diagrams of a control device in various stages of operation in accordance with aspects of the disclosed technology.

FIG. 10 depicts another dashboard user interface in accordance with aspects of the disclosed technology.

FIGS. 12A-12D depict another dashboard user interface in accordance with aspects of the disclosed technology.

FIG. 14 depicts another dashboard user interface in accordance with aspects of the disclosed technology.

FIG. 15 depicts another dashboard user interface in accordance with aspects of the disclosed technology.

FIG. 17 depicts another dashboard user interface in accordance with aspects of the disclosed technology.

FIGS. 18A-18B depict another dashboard user interface in accordance with aspects of the disclosed technology.

FIG. 20A depicts another dashboard user interface in accordance with aspects of the disclosed technology.

FIG. 22 depicts another dashboard user interface in accordance with aspects of the disclosed technology.

FIG. 25 depicts another dashboard user interface in accordance with aspects of the disclosed technology.

FIG. 27 depicts another dashboard user interface in accordance with aspects of the disclosed technology.

FIG. 28 depicts another dashboard user interface in accordance with aspects of the disclosed technology.

Figure 1A:
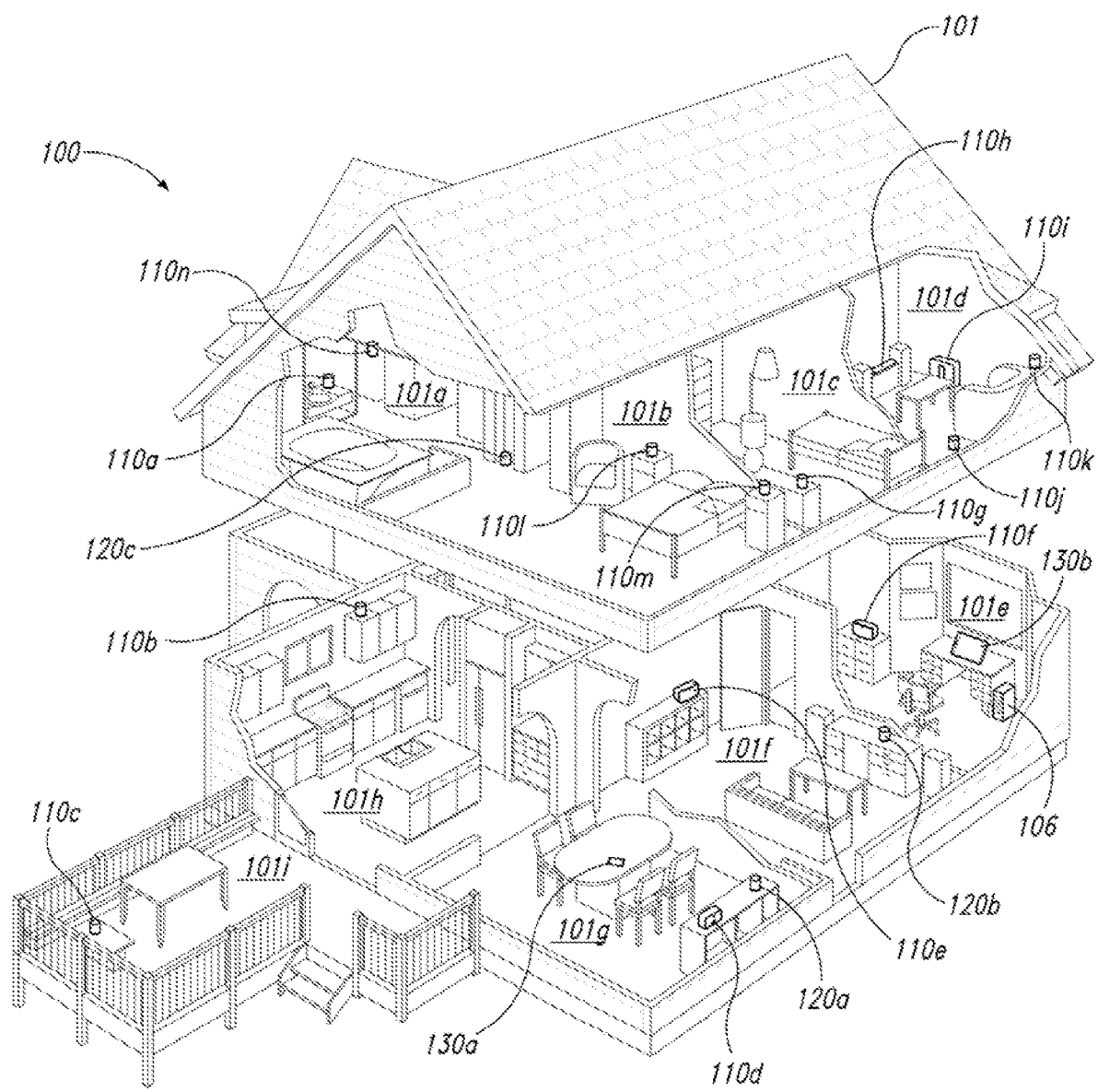
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to a dashboard user interface on a controller device. The dashboard may display to a user, such as a business owner, information relating to one or more media playback systems located at different physical locations (e.g., different buildings, different cities, etc.). For example, a business owner may own or manage multiple different branches or locations of a business. For example, the business may comprise a restaurant chain with multiple locations. The dashboard user interface provides the business owner with information and control relating to the audio content that is playing at each physical location.

In at least one embodiment, the dashboard user interface allows users to schedule particular audio content to be played by specific media playback systems and by specific rooms or locations within the specific media playback systems. For example, a user may be able to schedule a particular genre of audio content to play in the waiting area of a business in California, while scheduling a different genre of audio content to play in the waiting area of a business in Texas. Further, the user may be able to select the type of audio content that is played in check-out areas, parking areas, office areas, warehouse areas, etc.

The dashboard user interface may also provide a user with the ability to manage rights within each respective media playback system. For example, a business owner may restrict the playable audio content to only include commercially license audio content that has been licensed for playback within a commercial setting. However, the business owner may also provide location managers/supervisors with the ability to customize the audio content based upon the tastes of the local market. As such, in at least one embodiment, a user can establish customized permissions and settings that can be applied to all media playback systems controlled by the controller device while also allowing limited rights to others. Additional examples of controlling rights are provided herein.

In some embodiments, for example, a computer system for executing a controller interface comprises one or more processors and one or more computer-readable media having stored thereon executable instructions. The computer system can display a visual representation of one or more media playback systems. The one or more media playback systems may be located in different physical buildings. At least a portion of the one or more playback systems comprise multiple playback devices. The computer system displays a schedule interface that interface displays options for scheduling particular rooms within particular locations to play particular audio content.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices 120 ("NMDs") (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 110a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a main bathroom 101a, a main bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101e, main bathroom 101a, main bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the main bathroom 101a, the second bedroom 101c, the office 101e, the living room 101f, the dining room 101g, the kitchen 101h, and the outdoor patio 101i each include one playback device 110, and the main bedroom 101b and the den 101d include a plurality of playback devices 110. In the main bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
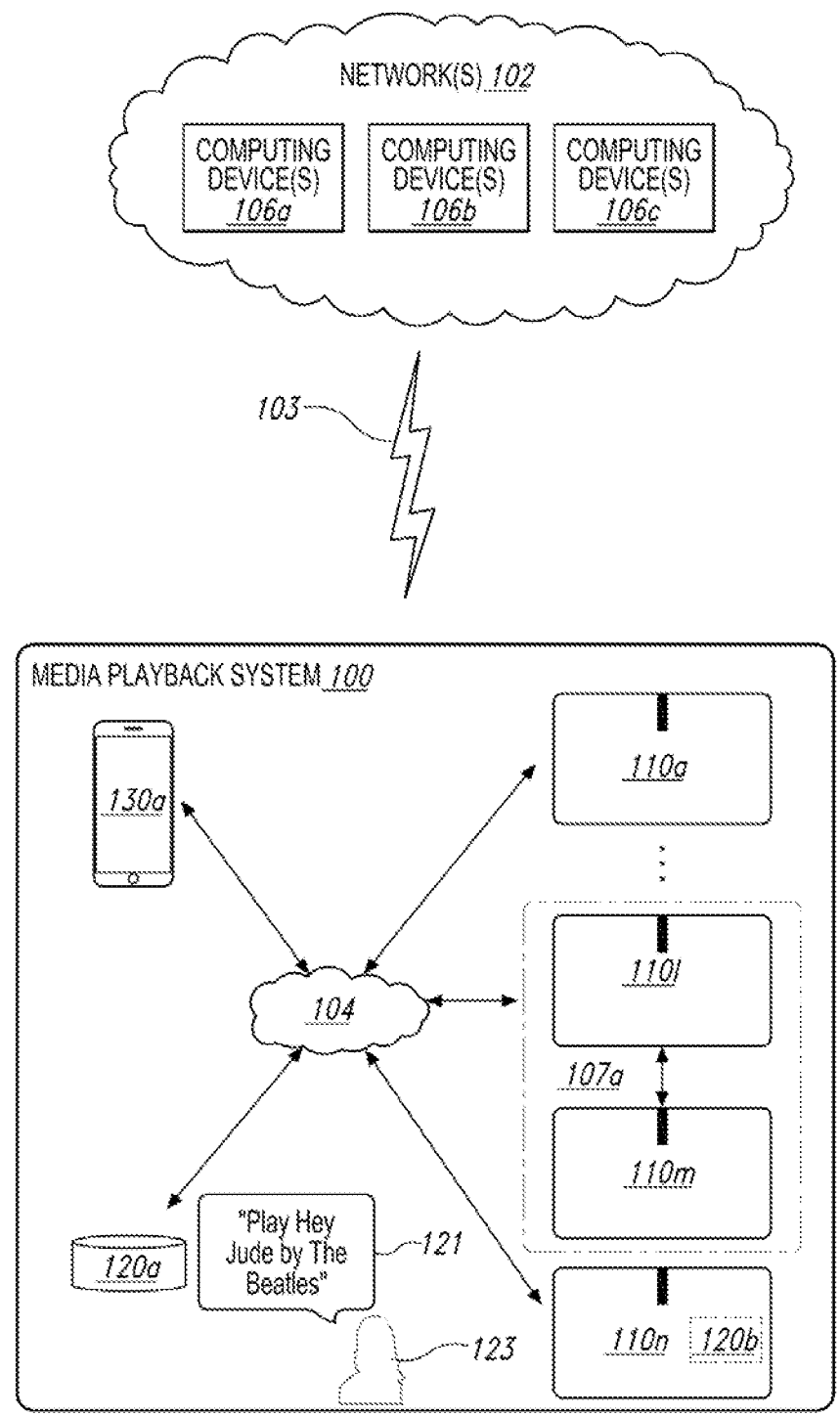
FIG. 1B is a schematic diagram of the media playback system of FIG. 1A and one or more networks.
Figure 1I:
FIGS. 1I-1L are schematic diagrams of corresponding media playback system zones.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100.

In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103.

In response to receiving the voice input data, the computing device 106*c* processes the voice input data (i.e., "Play Hey Jude by The Beatles"), and determines that the processed voice input includes a command to play a song (e.g., "Hey Jude"). In some embodiments, after processing the voice input, the computing device 106*c* accordingly transmits commands to the media playback system 100 to play back "Hey Jude" by the Beatles from a suitable media service (e.g., via one or more of the computing devices 106) on one or more of the playback devices 110. In other embodiments, the computing device 106*c* may be configured to interface with media services on behalf of the media playback system 100. In such embodiments, after processing the voice input, instead of the computing device 106*c* transmitting commands to the media playback system 100 causing the media playback system 100 to retrieve the requested media from a suitable media service, the computing device 106*c* itself causes a suitable media service to provide the requested media to the media playback system 100 in accordance with the user's voice utterance.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY: 1," "PLAY: 3," "PLAY: 5," "PLAYBAR," "PLAYBASE," "CONNECT: AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partial schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™ an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™ an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

e. Suitable Playback Device Configurations

Figure 1J:
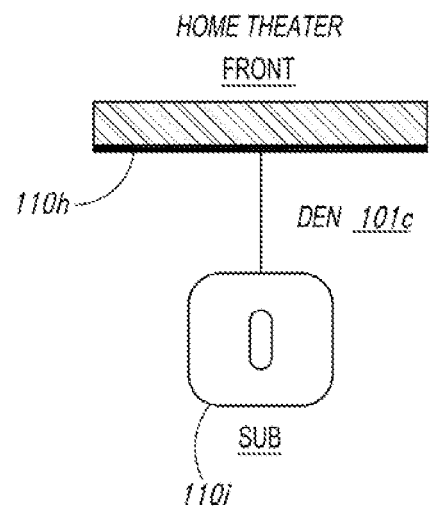
Figure 1K:
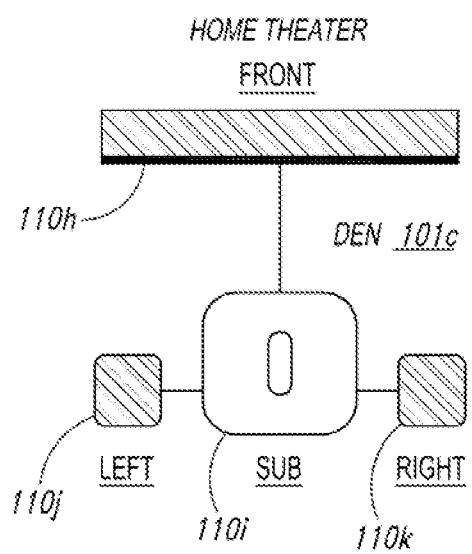
Figure 1L:
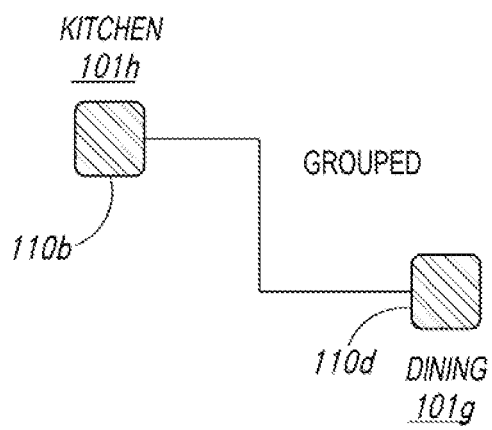
Figure 1M:
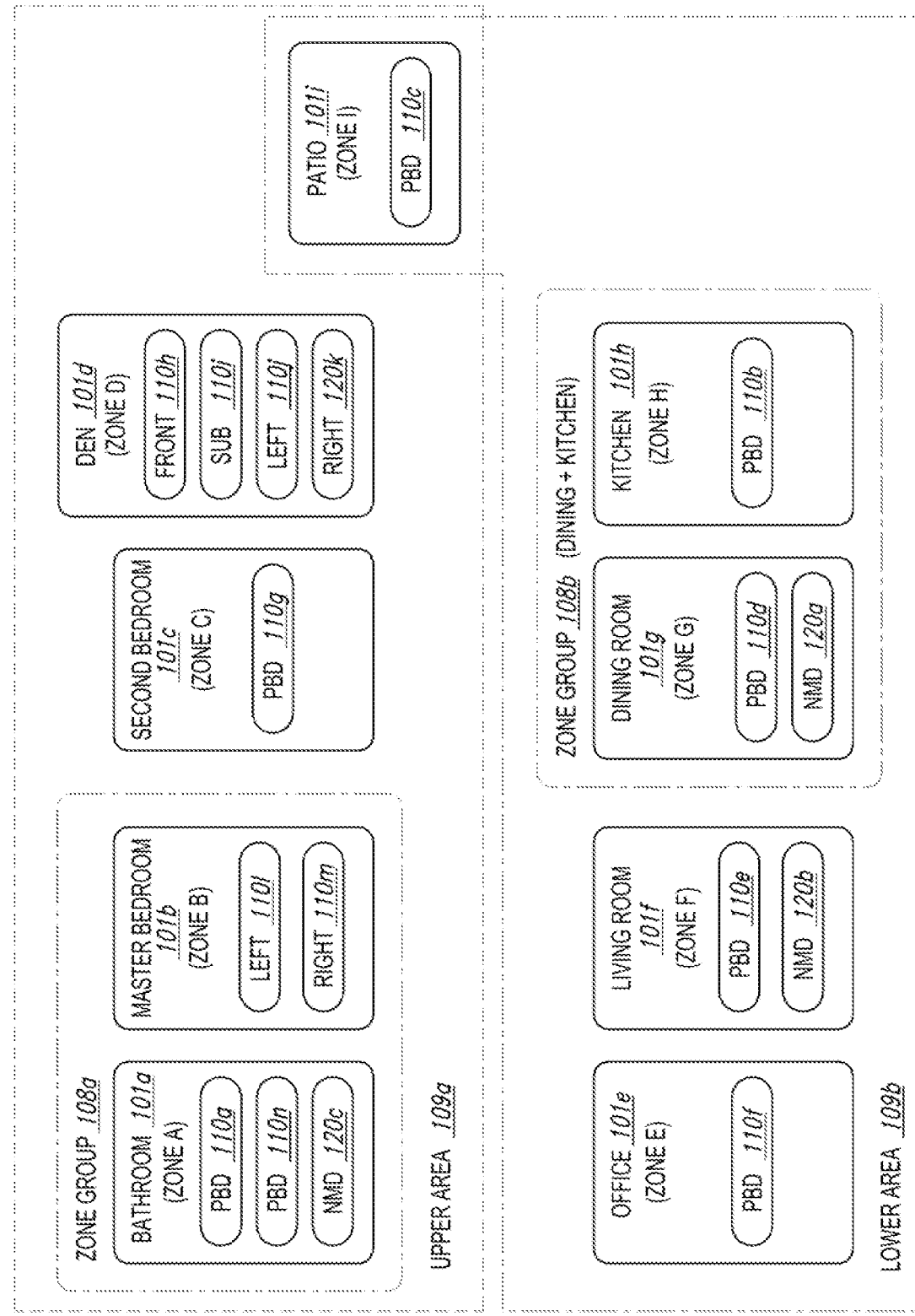
FIG. 1M is a schematic diagram of media playback system areas.

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may aside from playing audio content in synchrony, each play audio content as they would if they were not merged.

Each zone in the media playback system 100 may be provided for control as a single user interface (UI) entity. For example, Zone A may be provided as a single entity named Main Bathroom. Zone B may be provided as a single entity named Main Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the main bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have been assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017, and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
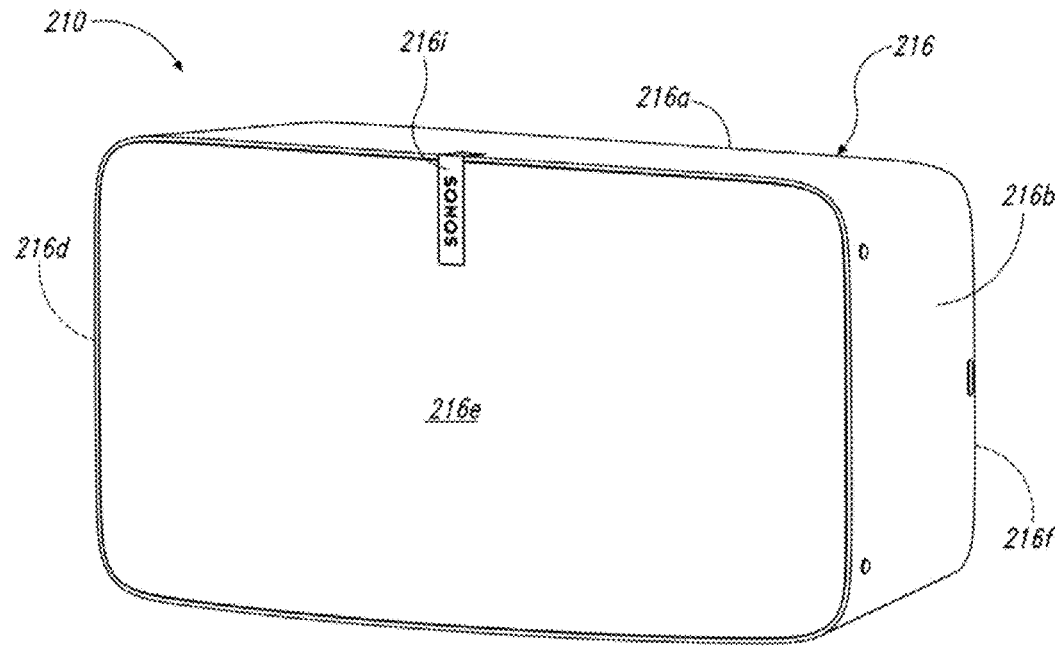
FIG. 2A is a front isometric view of a playback device configured in accordance with aspects of the disclosed technology.
Figure 2B:
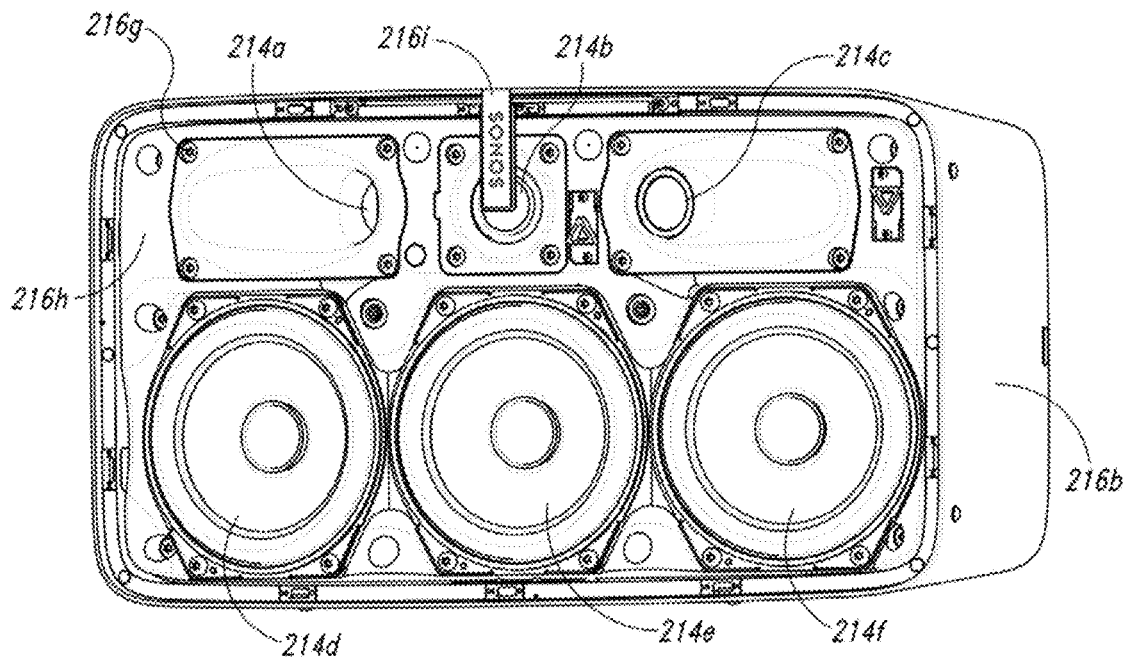
FIG. 2B is a front isometric view of the playback device of FIG. 3A without a grille.
Figure 2C:
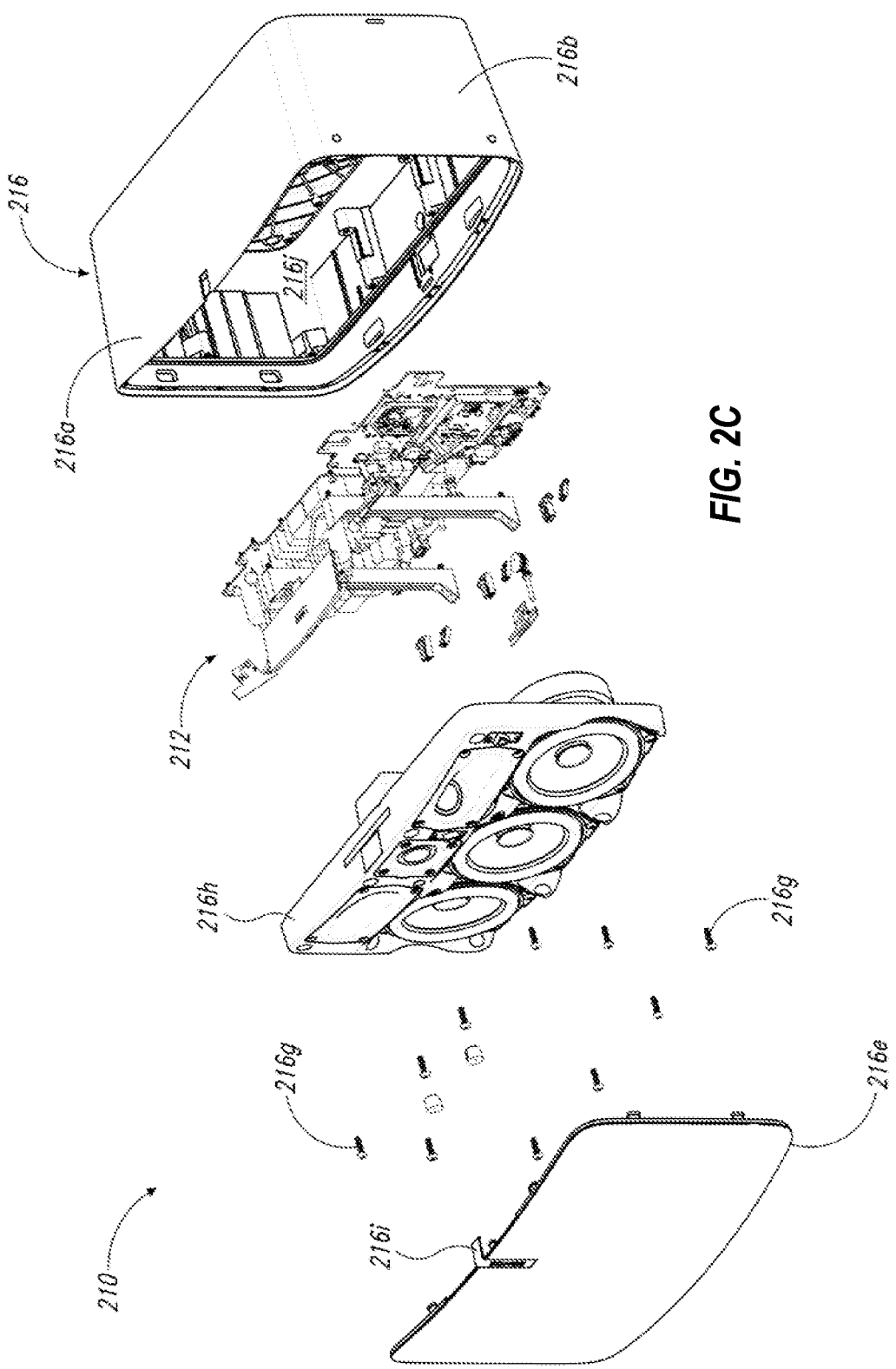
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
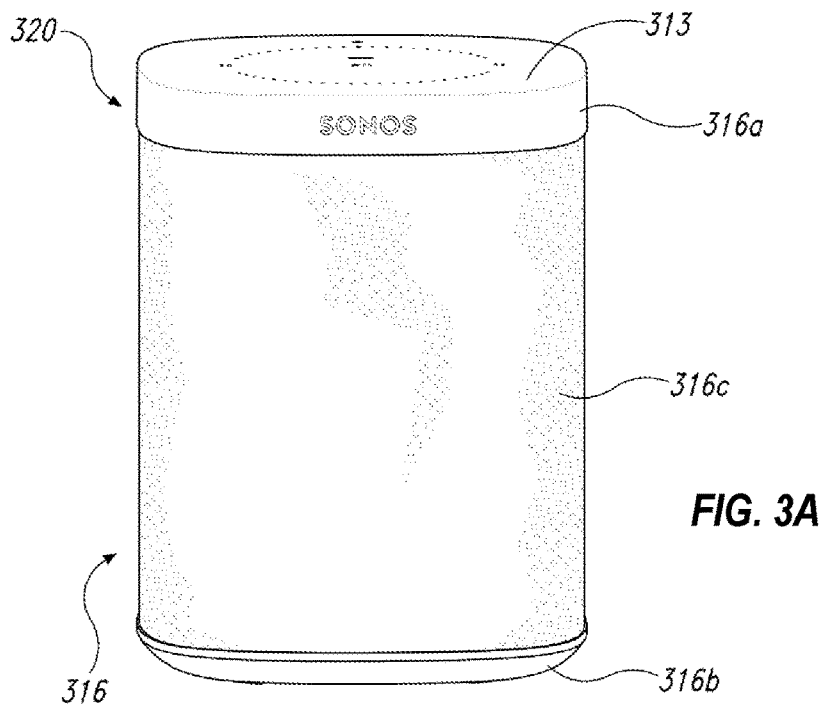
FIG. 3A is a front view of a network microphone device configured in accordance with aspects of the disclosed technology.
Figure 3B:
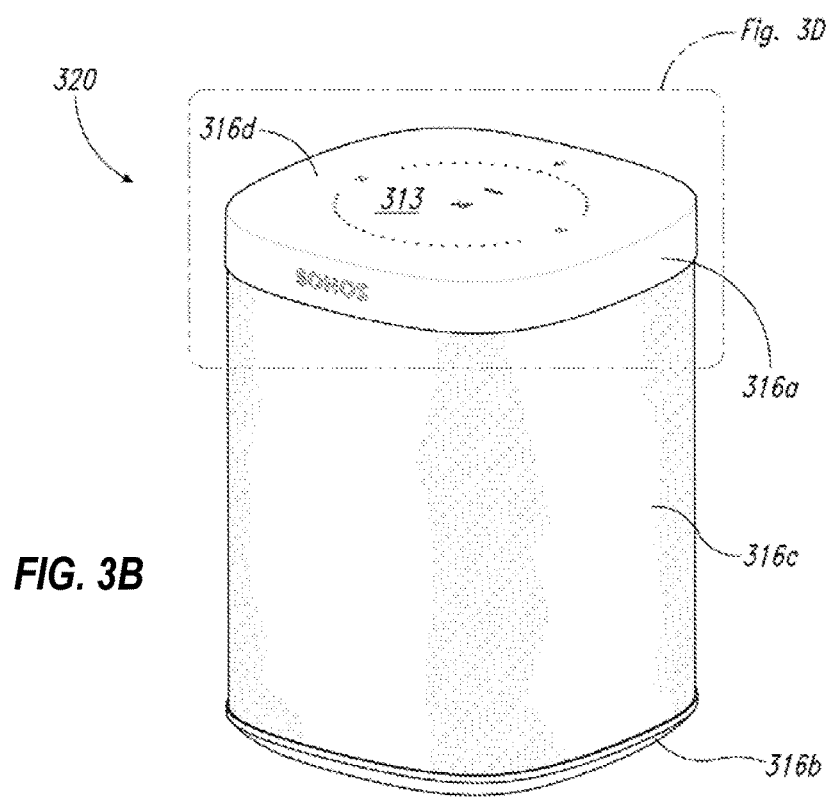
FIG. 3B is a side isometric view of the network microphone device of FIG. 3A.
Figure 3C:
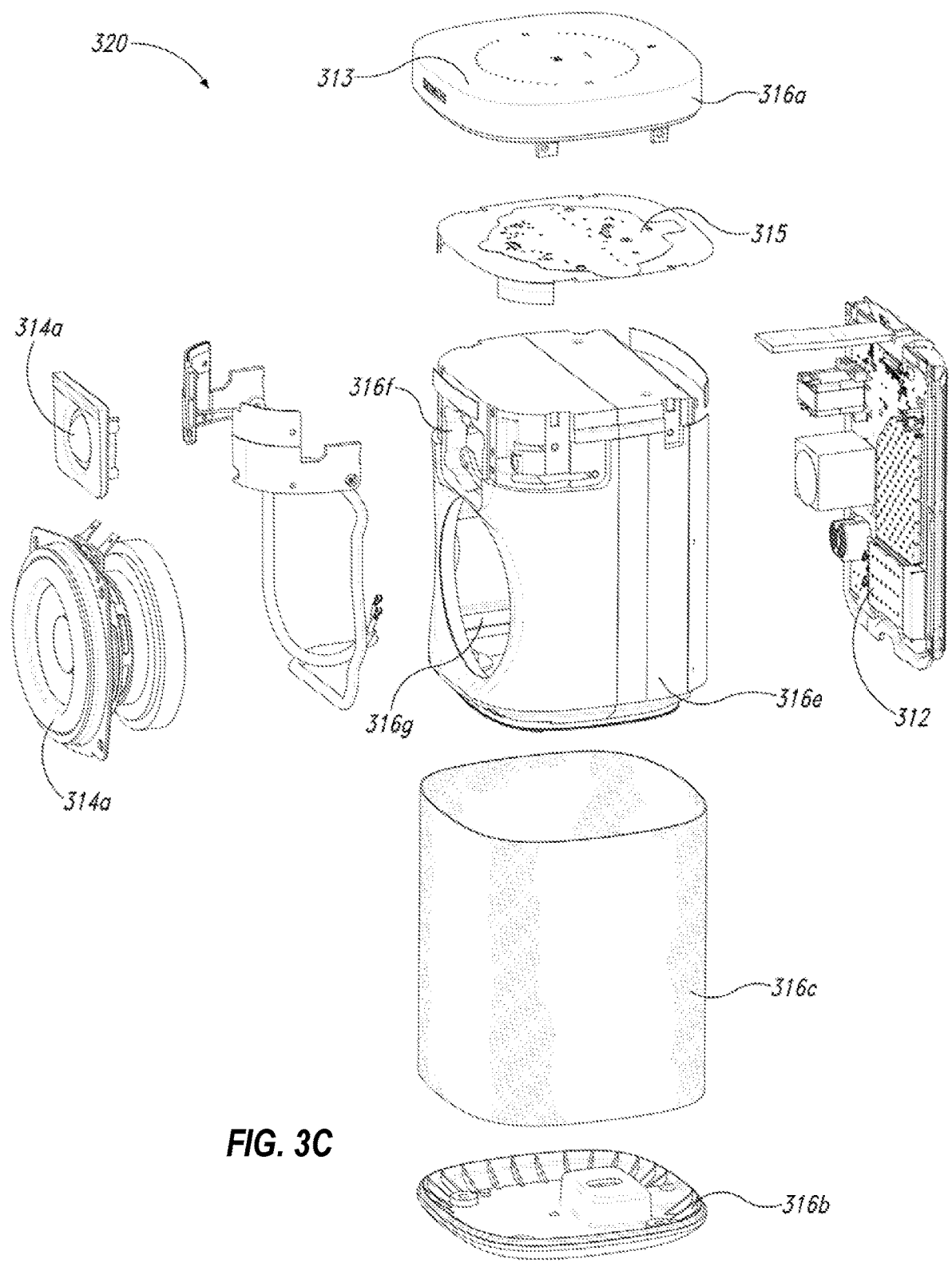
FIG. 3C is an exploded view of the network microphone device of FIGS. 3A and 3B.
Figure 3D:
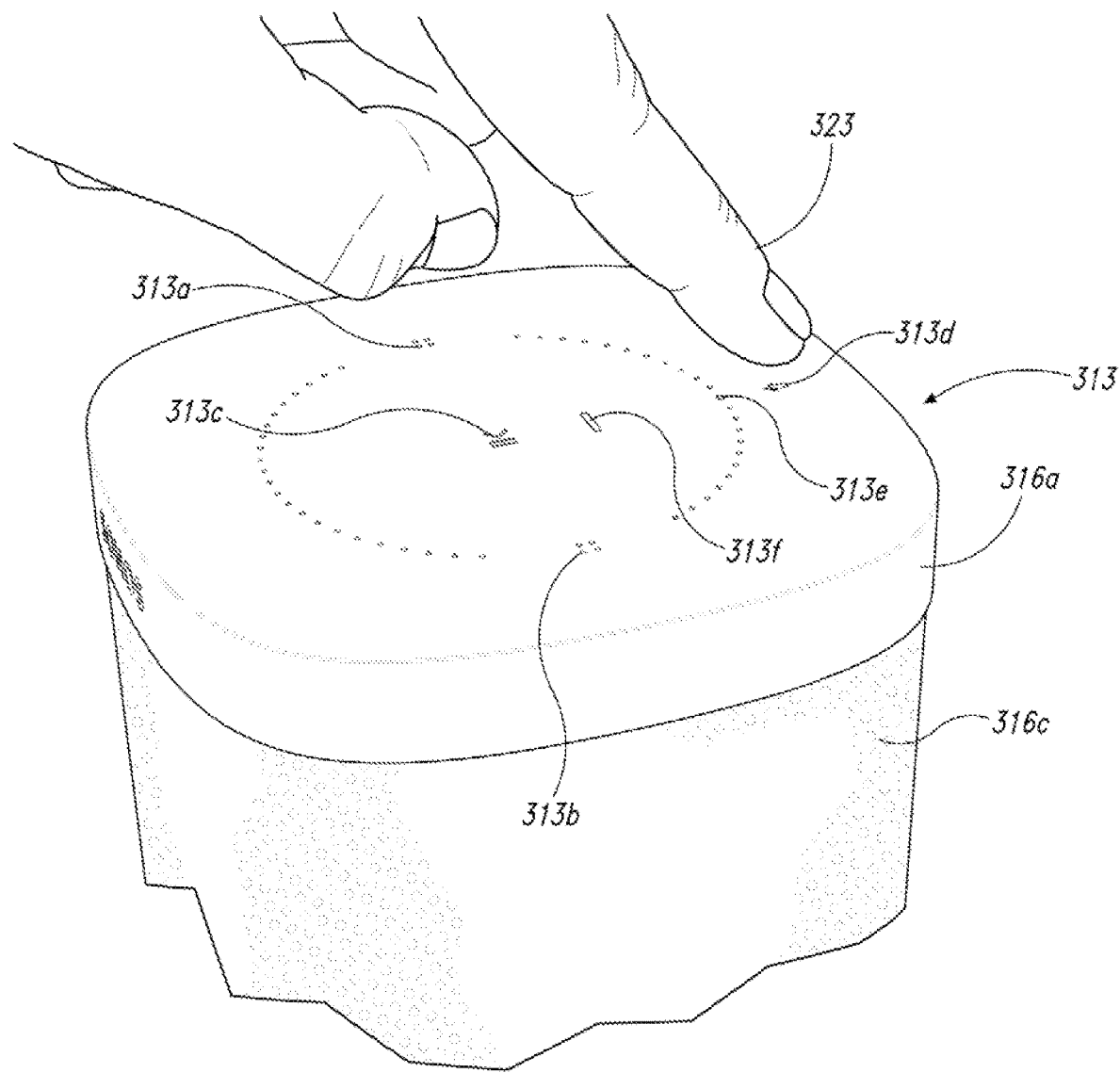
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
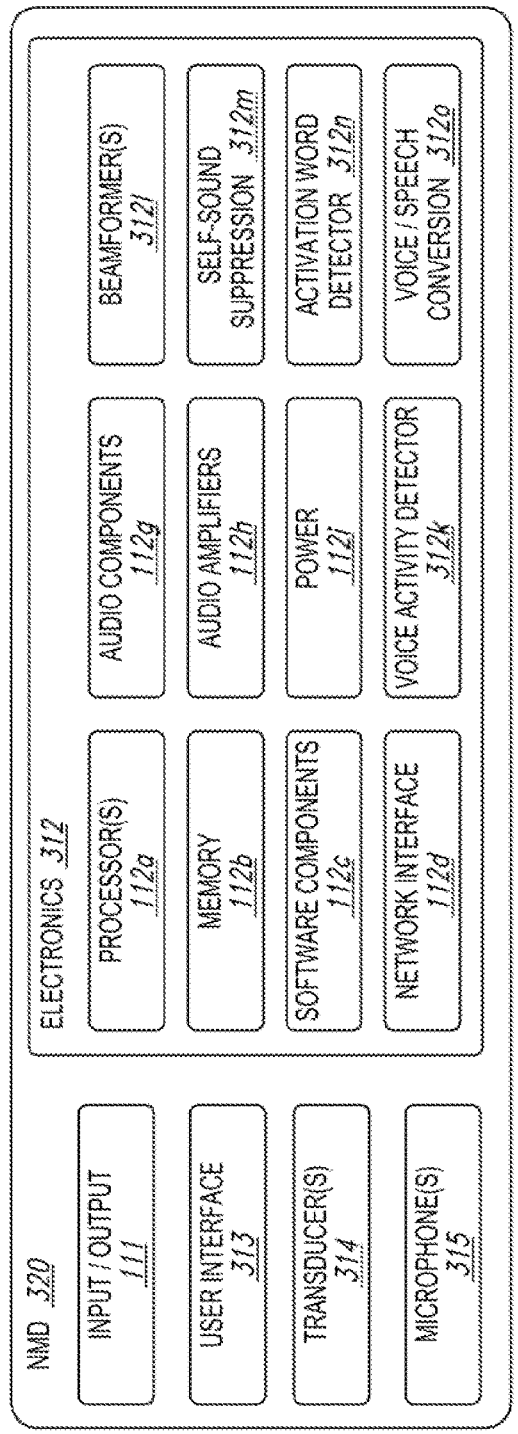
FIG. 3E is a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
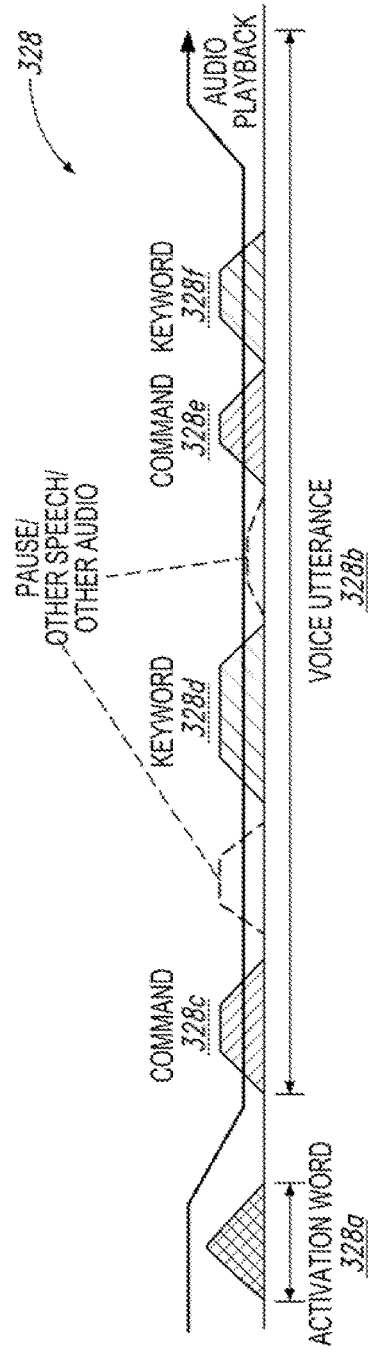
FIG. 3F is a schematic diagram of an example voice input.

FIG. 3F is a schematic diagram of an example voice input 328 captured by the NMD 320 in accordance with aspects of the disclosure. The voice input 328 can include an activation word portion 328a and a voice utterance portion 328b. In some embodiments, the activation word 557a can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
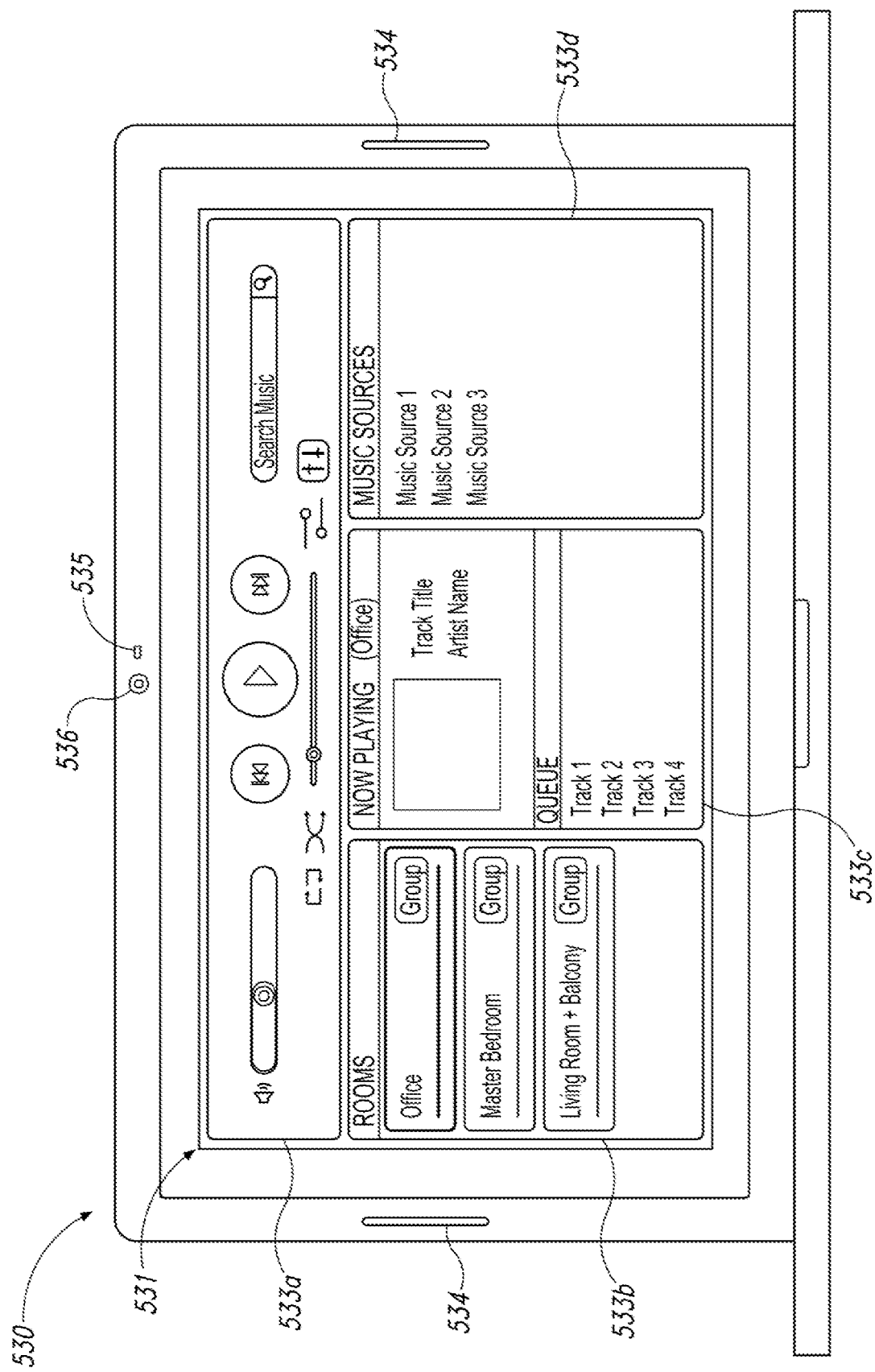
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
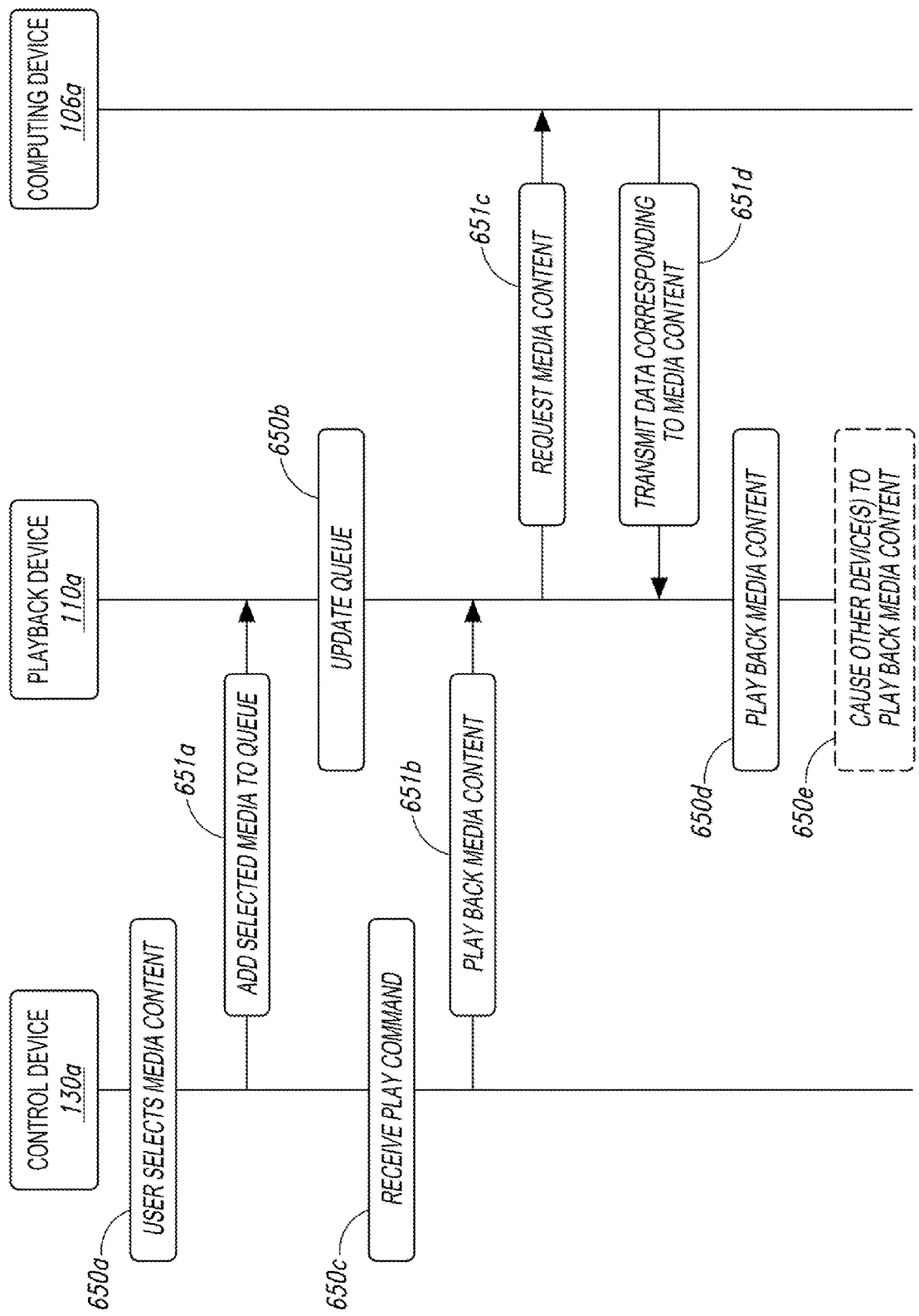
FIG. 6 is a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

IV. Controller Interface

In various embodiments, a dashboard user interface may comprise a controller interface rendered in any form on a computer interface, including those rendered on mobile devices, personal computers, and/or on any control device. The dashboard user interface may provide a user with the ability to control and/or monitor playback devices 110 associated with different media playback systems 100 located in various different locations, or environments 101. Accordingly, a dashboard user interface may serve as an administration portal for administering playback devices that are associated with different media playback systems 100. The dashboard user interface may provide particular utility to the owner or manager of a business or organization that comprises multiple physical locations with each location comprising its own media playback system 100.

Embodiments described herein relate to a dashboard user interface on a controller device. The dashboard may display to a user, such as a business owner, information relating one or more media playback systems located at different physical locations (e.g., different buildings, different cities, etc.). For example, a business owner may own or manage multiple different branches or locations of a business. For instance, the business may comprise a restaurant chain with multiple locations. The dashboard user interface provides the business owner with information and control relating to the audio content that is playing at each physical location.

Figure 7A:
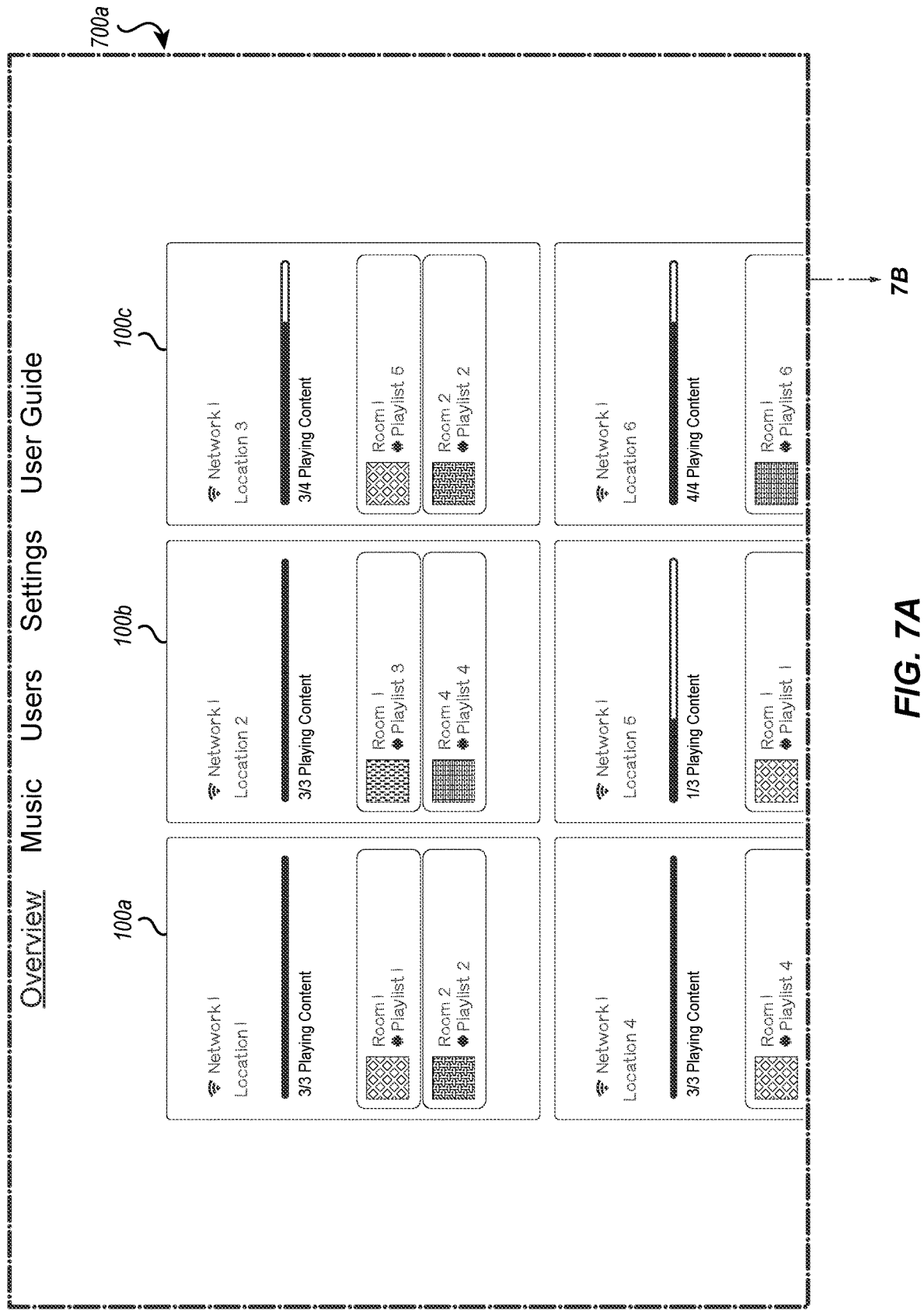
FIGS. 7A-7B depict a dashboard user interface in accordance with aspects of the disclosed technology.
Figure 7B:
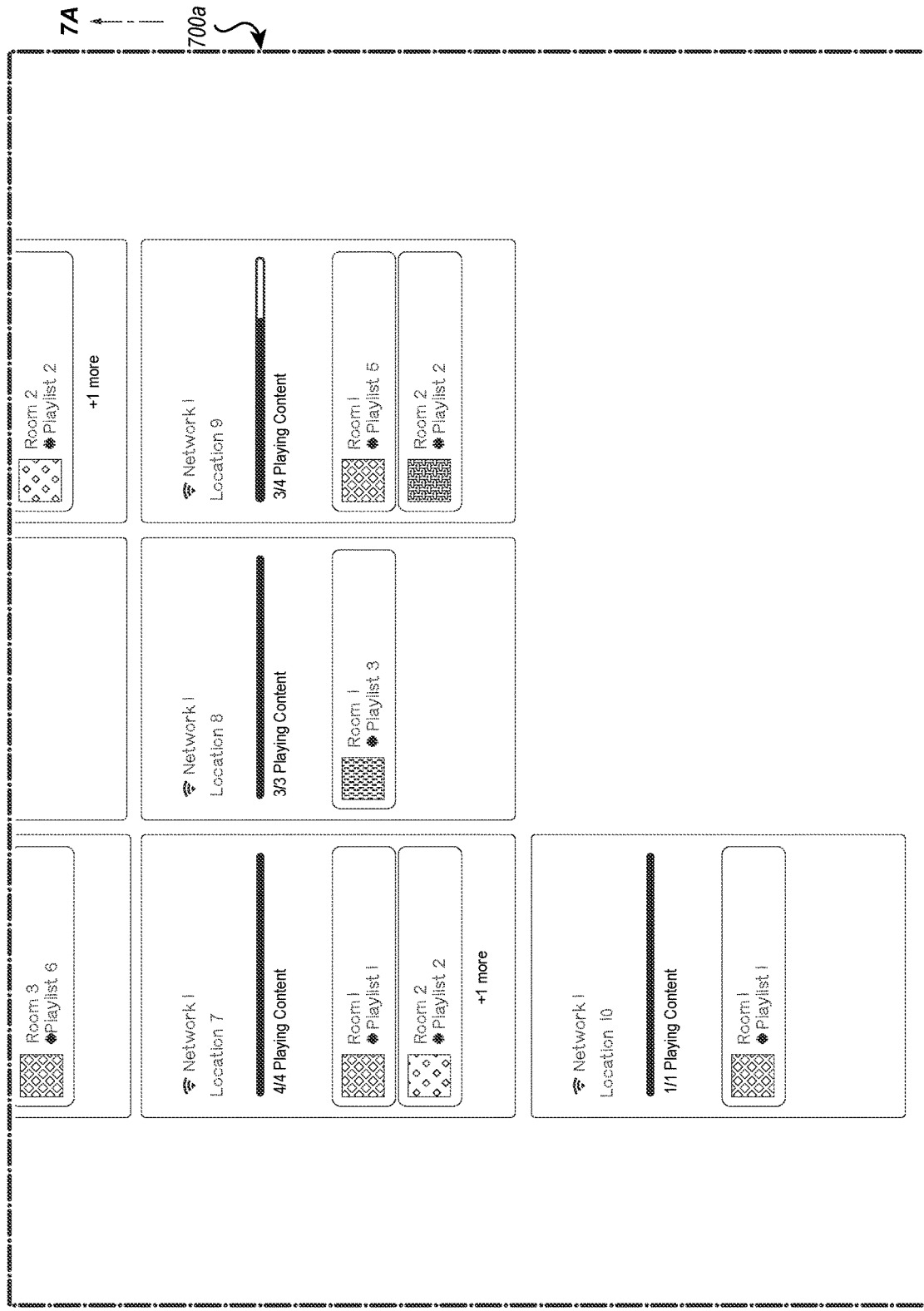

For example, FIGS. 7A-7B depict a dashboard user interface 700a in accordance with aspects of the disclosed technology. Throughout this description dashboard user interface "700" will be used to describe the dashboard user interface generally. The dashboard user interface 700a comprises an example of an overview page. The overview page depicts multiple different media playback systems 100(a-c). In at least one embodiment, each depicted media playback system 100 is shown as being associated with a particular location (e.g., "location 1," "location 2," "location 3").

The dashboard user interface 700a may also depict one or more rooms (e.g., "Room 1," "Room 2,") that are associated with each media playback system 100(a-c). As used herein, a "room" refers to any collection of playback devices that have been grouped together into a zone, room, or physical area of a building or location. Further, the dashboard user interface 700a may display information about the audio content being played in at least a portion of the one or more rooms. Accordingly, a user can view the status of each media playback system 100 and the status of various rooms within each media playback system including metadata of media being played back in the various rooms. A user may also be able to view network connectivity data relating to each media playback system, including but not limited to a strength of connection to a network and a name of a connected WIFI network. With the dashboard user interface 700a, the user can quickly determine and identify status of every playback device in the media playback system 100. Further, a user may be able to cause playback content to play, stop, skip, or any other command on a per-room basis. As such, a user may have controls that extend beyond a per-location basis and allow the user to have control of the entire playback systems 100 at a given location.

Figure 8A:
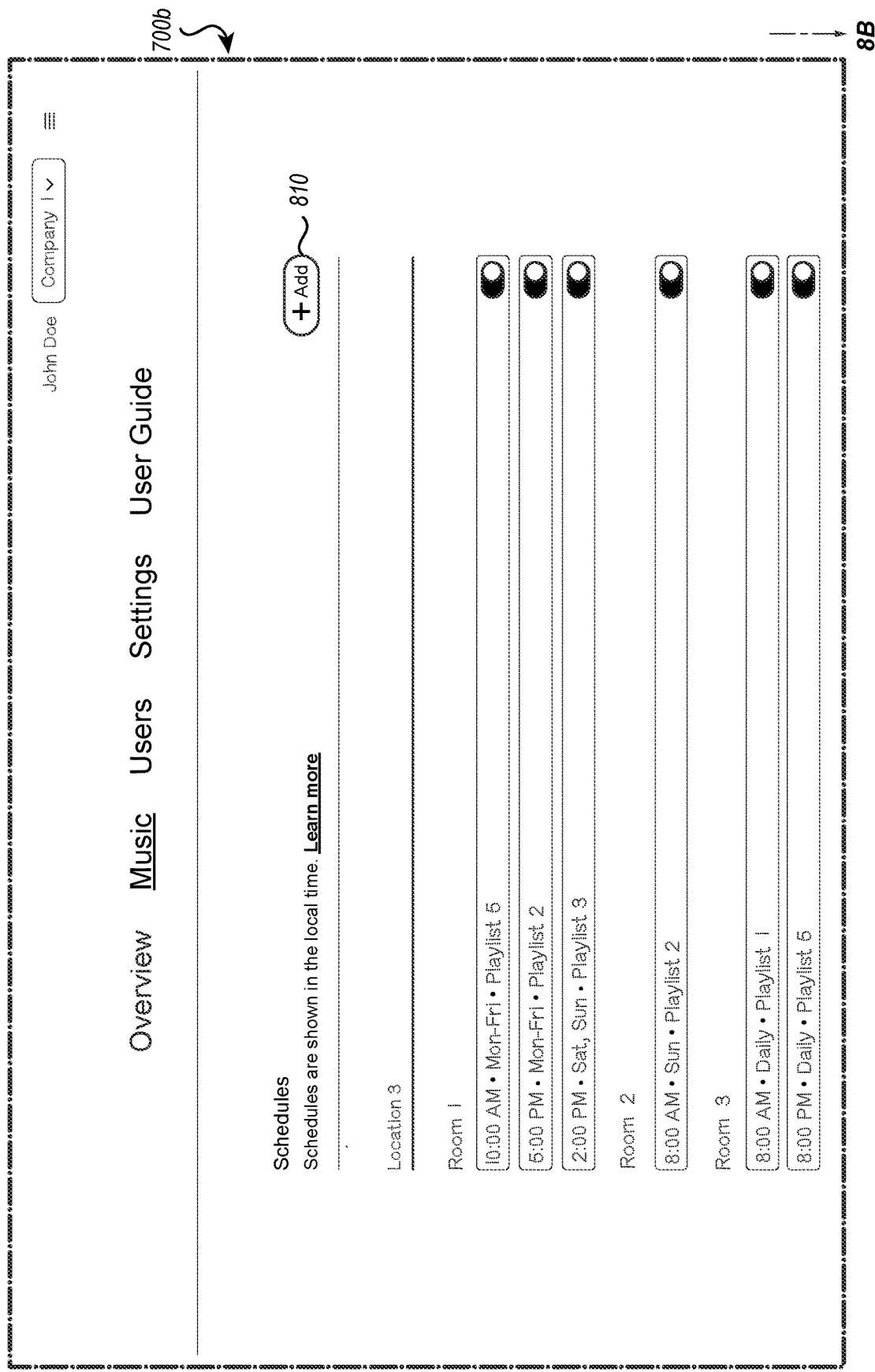
FIGS. 8A-8C depict another dashboard user interface in accordance with aspects of the disclosed technology.
Figure 8B:
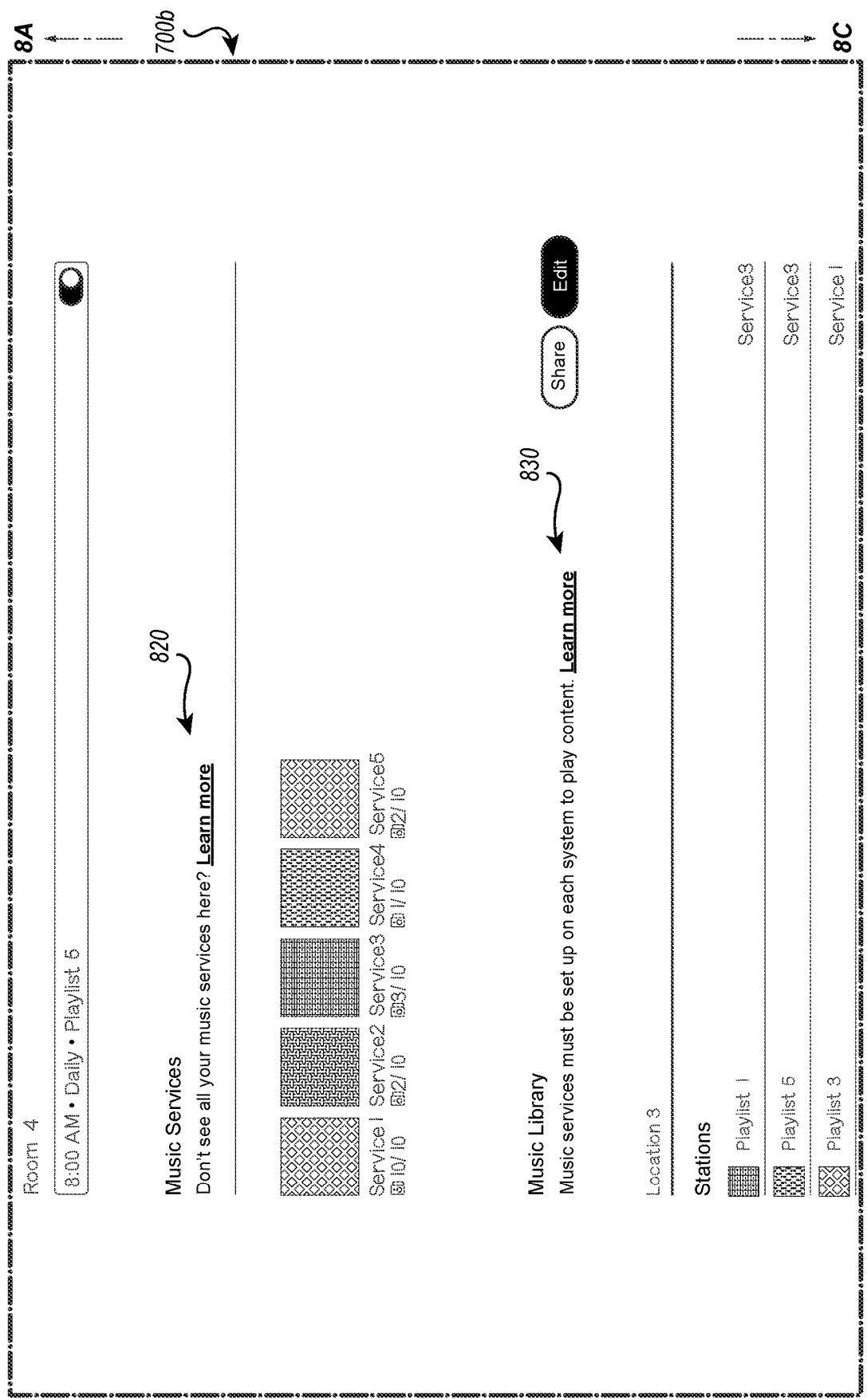
Figure 8C:
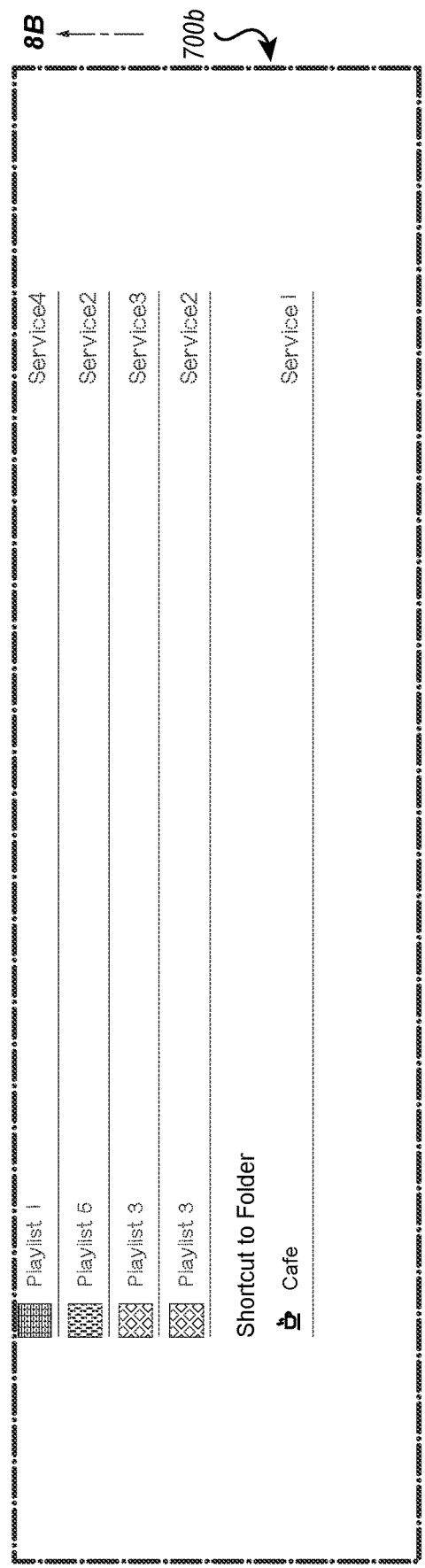

FIGS. 8A-8C depict another dashboard user interface in accordance with aspects of the disclosed technology. The dashboard user interface 700b comprises an example of an "Music" page that may be accessible by selecting the "Music" tab in the previous "overview" page. In at least one embodiment, the dashboard user interface 700b comprises a menu to select from the various different media playback systems 100(a-c) associated within the dashboard user interface 700b. The media playback systems 100(a-c) may be selectable based upon their location or based upon another identifier. The dashboard user interface 700b may provide a scheduling function. For example, one or more rooms associated with a selected location may be displayed within the schedule. Each room may comprise one or more audio playback types and one or more times associated with the audio playback types. For example, Room 1 may comprise a first type of music that is scheduled to begin playing at 10 AM and then a second type of music that is scheduled to begin playing at noon. The "types of music" may comprise playlists, albums, specific genres, specific stations, or any other collection of audio content.

The dashboard user interface 700b may also provide a user with the ability to manipulate the schedules 810. For example, a user may be able to deactivate a particular scheduled event, activate a schedule event, edit a scheduled event, create a scheduled event, or other manipulate the schedules. For example, the dashboard user interface 700b may provide options for adjusting schedules on a per-location basis, a per-room basis, or a per playback device basis.

Additionally, the dashboard user interface 700b may provide options for selecting available playback services 820. For example, a particular user may have subscribed to various different music services (e.g., Spotify, Radio by Tunein, Apple Music, Pandora, Amazon, TV, local music, etc.). In some cases, however, the music service subscriptions may only apply to specific media playback systems 100(a-c) such that not every media playback system 100(a-c) within the dashboard user interface 700b has access to the same music services. The dashboard user interface 700b may display the status and availability of each playback service 820. In some embodiments, dashboard user interface 700b provides a user with options for subscribing to playback services and/or editing existing subscriptions to playback services. The dashboard user interface 700b may also comprise a music library portion 830 that displays the audio content available for a given media playback system, location, room, or playback device. The ability to share and/or edit playback services, the music library, and/or favorites may be dependent on the role and/or permissions set for the account. For example, a user may be prevented from sharing a list of playback content with a particular location if that location does not have rights or permissions to all of the playback content in the list. Additionally or alternatively, the user may be allowed to share the list of playback content, but the restricted playback content may be removed from the list prior to being shared with the particular location.

Figure 9:
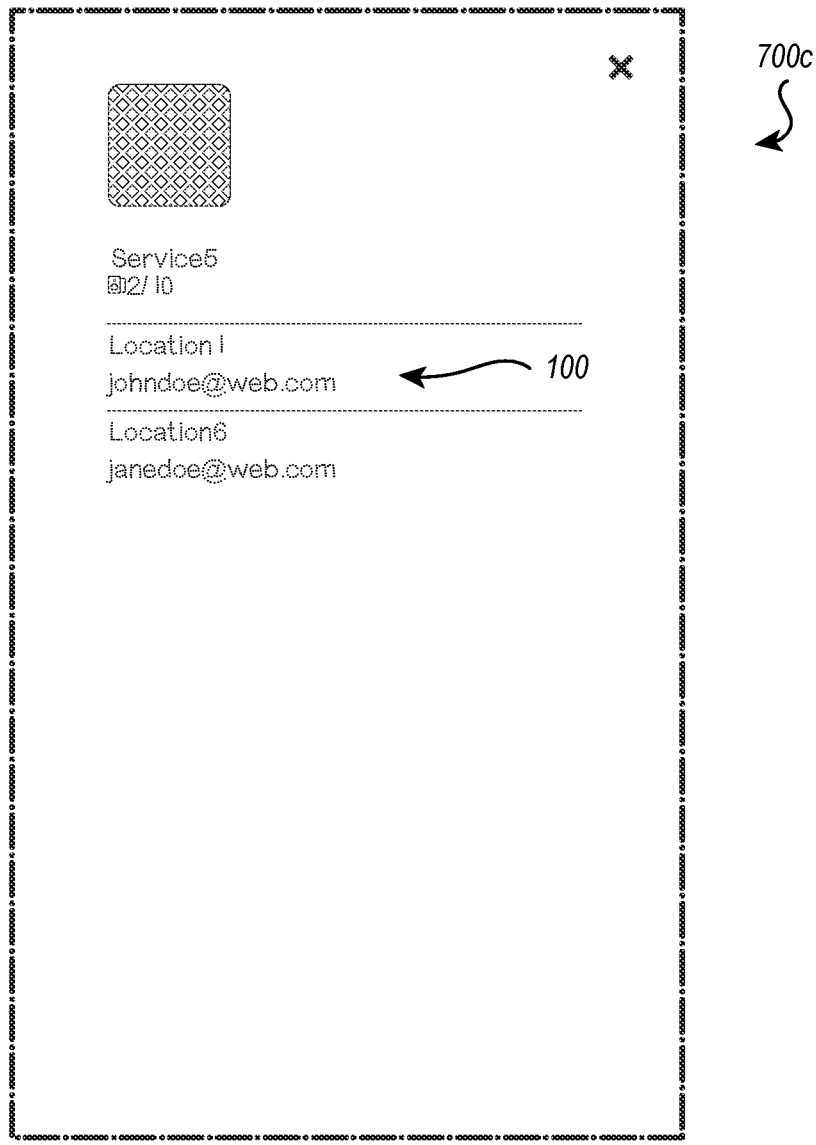
FIG. 9 depicts another dashboard user interface in accordance with aspects of the disclosed technology.

FIG. 9 depicts another dashboard user interface 700c in accordance with aspects of the disclosed technology. The dashboard user interface 700c may be rendered in response to a user selecting a particular playback service 820. In this depicted embodiment, dashboard user interface 700c displays the name of the playback service 820, the playback systems 100 associated with the playback service 820, the accounts registered with the service at each location, and/or contact information for each playback system 100. Dashboard user interface 700c serves to provide a summary of all accounts of a particular playback service registered at any location in playback system 100.

Figure 10:
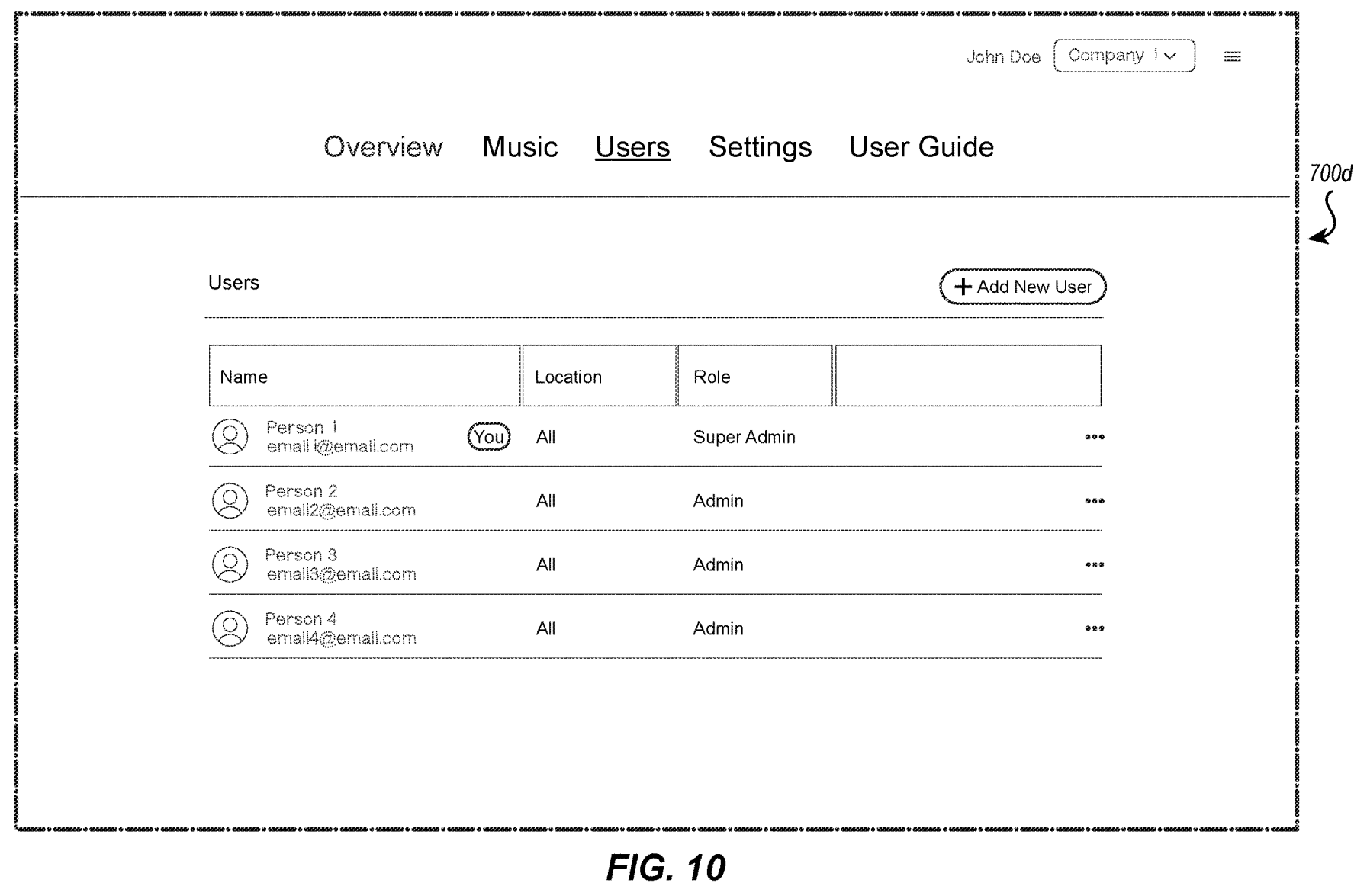

FIG. 10 depicts another dashboard user interface 700d in accordance with aspects of the disclosed technology. The dashboard user interface 700d may be accessed by selecting the "User" tab from FIGS. 7A-8B. Dashboard user interface 700d provides a user with an interface for adding users and controlling permissions to the dashboard user interface 700. From this interface, new administrators may be invited to administrate at least a portion of the playback systems 100. A user (i.e., "super admin") may be able to limit each administrator to particular playback systems 100, particular rooms within playback systems, particular functions, and/or to any other aspect of the playback systems 100 as described herein. For example, a super admin user may have access to all permissions and access levels and full control playback systems 100. An admin may have access to only a subset of permissions or access or control privileges for playback systems 100. On the dashboard user interface 700, "admin" level users may have settings or control aspects for which the admin user is not able to interact with hidden or removed from view or the buttons on the dashboard user interface may be rendered inactive (e.g., greyed out) such that selection of the button does not cause any actions.

Figure 11:
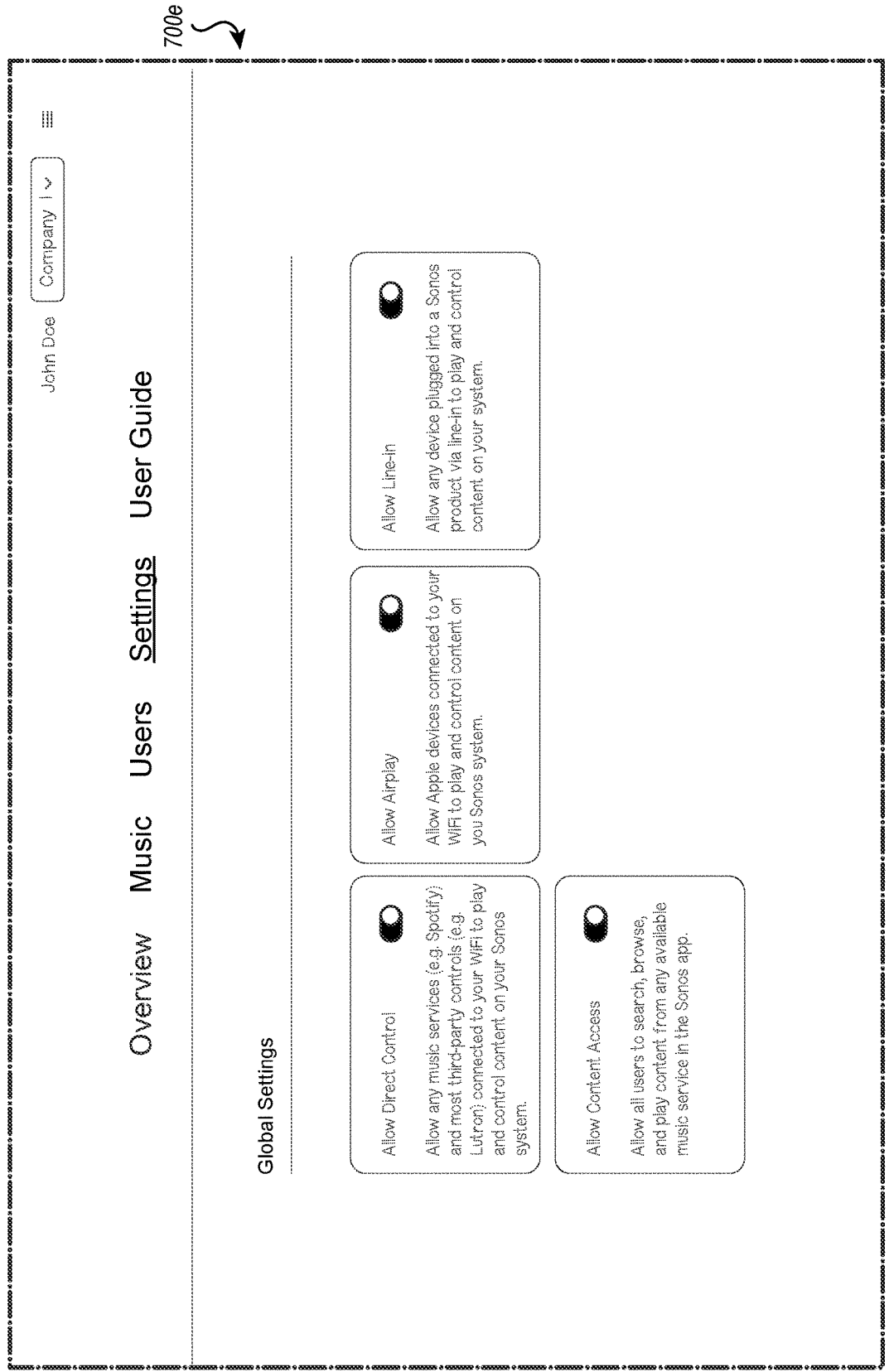
FIG. 11 depicts another dashboard user interface in accordance with aspects of the disclosed technology.
Figure 12B:
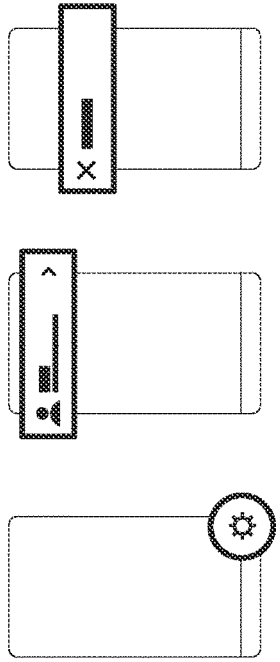
Figure 12C:
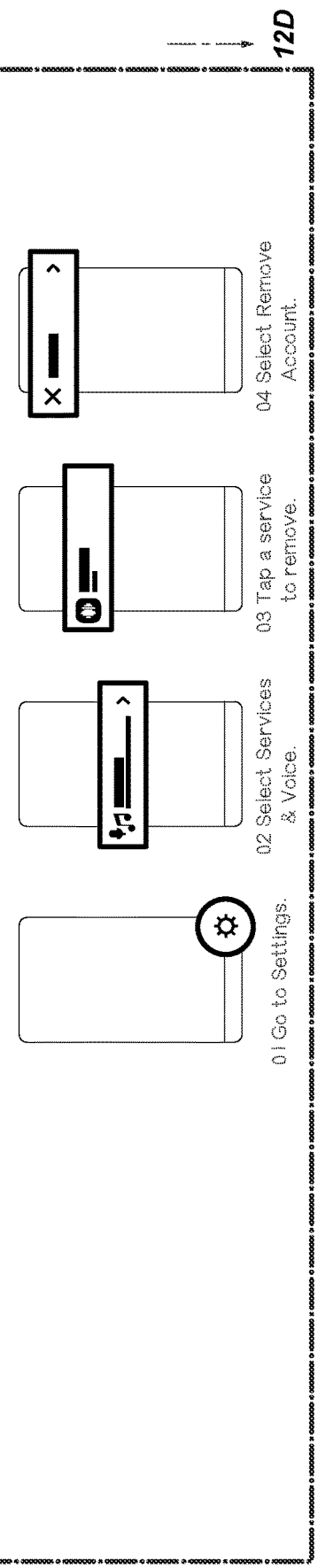
Figure 12D:
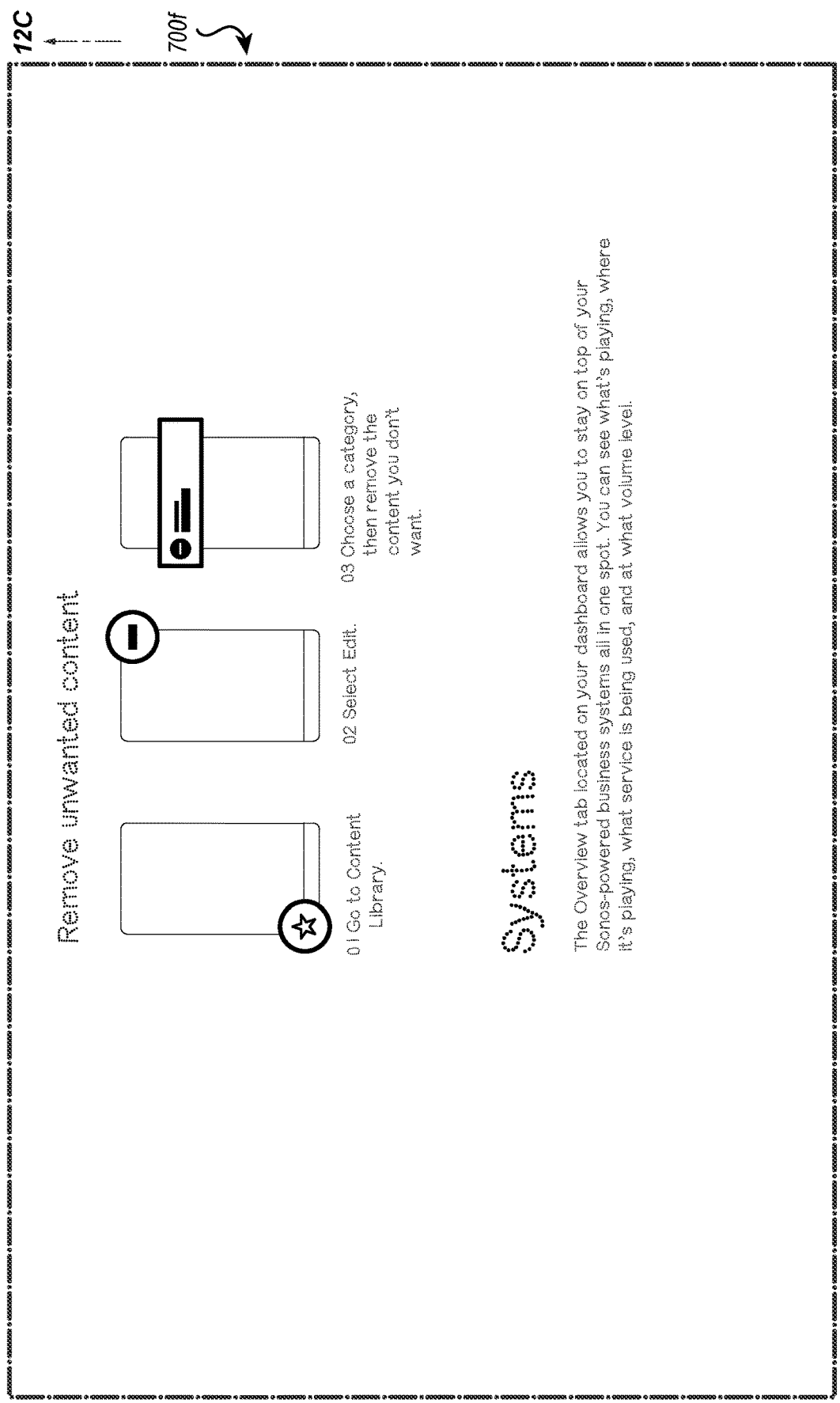

FIG. 11 depicts another dashboard user interface 700e in accordance with aspects of the disclosed technology. Dashboard user interface 700e comprises a settings tab that allows a user to adjust various settings relating to the dashboard user interface 700. For example, the user may be able to allow or disallow "direct control" of playback devices globally (i.e., through all associated playback systems 100). For example, if the user does not want third-party software or devices interacting with the playback devices, the user may disallow "direct control." Similarly, the user may be able to allow or disallow AIRPLAY from APPLE or physical line-in access to playback devices. The user may also be able to limit or allow other users to browse content from within specified applications. Any other integrations or settings that would allow direct access to playback systems outside of the dashboard or authorized control device may be enabled or disabled via dashboard user interface 700e. Through dashboard user interface 700e, appropriate users may fully control content being played back at different locations.

The depicted settings are provided for the sake of example and explanation. In at least one embodiment, additional settings may be present such as settings that allow or disallow the playing of explicit content, settings that allow or disallow the changing of volume, and various other similar settings. Further, in at least one embodiment, the settings may be applied globally, on a per-playback system basis, on a per-room basis, and/or on a per-playback device basis.

FIGS. 12A-12D depict another dashboard user interface 700f in accordance with aspects of the disclosed technology. Dashboard user interface 700f comprises a user guide tab that provides a user with support and instructions relating to the dashboard user interface 700. Dashboard user interface 700f may comprise FAQs, video instruction content, and various other instructional content that assists a user in operating and navigating the dashboard user interface 700.

Figure 13:
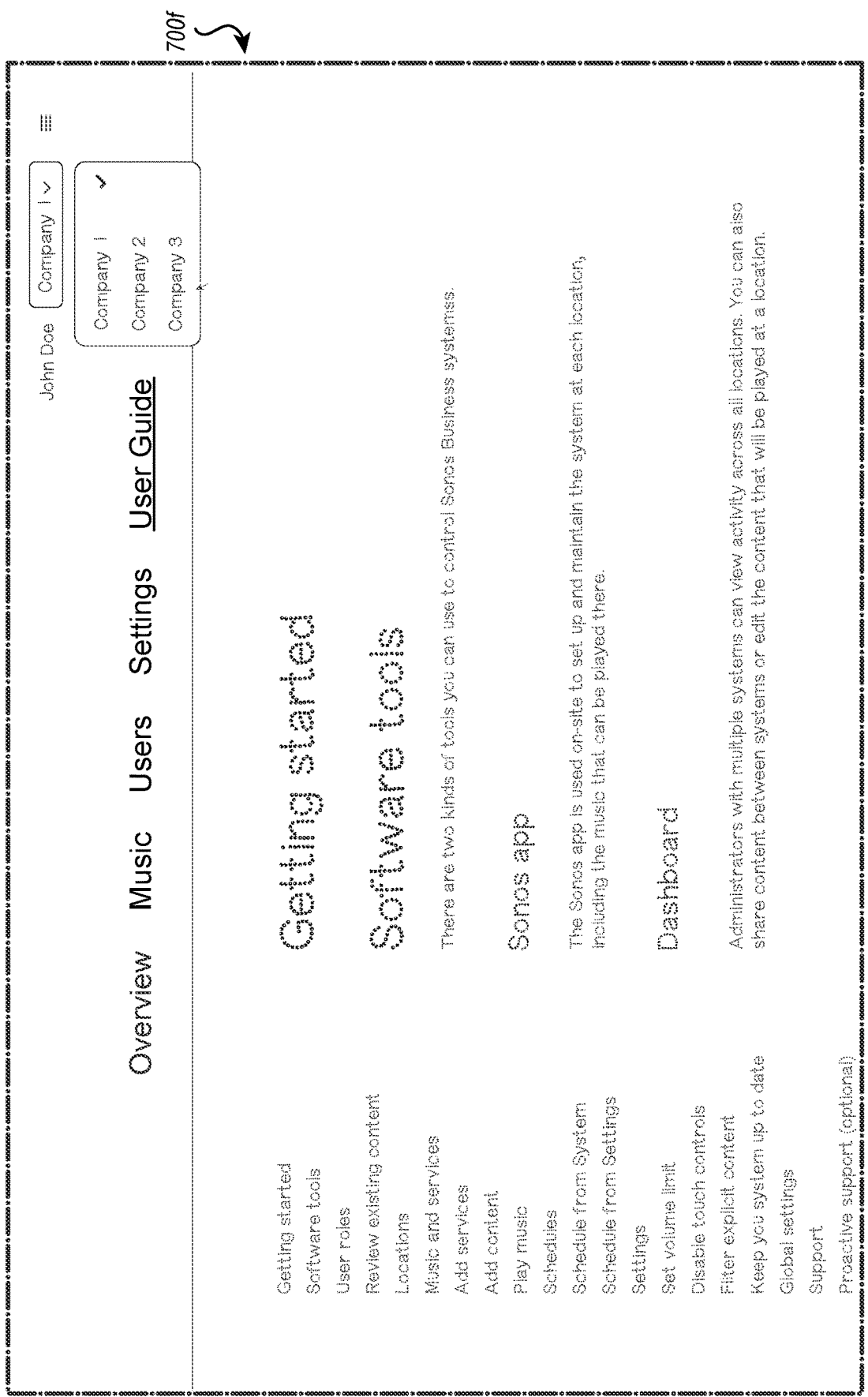
FIG. 13 depicts another dashboard user interface in accordance with aspects of the disclosed technology.

FIG. 13 depicts another dashboard user interface 700f in accordance with aspects of the disclosed technology. The dashboard user interface 700f of FIG. 13 is the same dashboard user interface 700f depicted in FIGS. 12A-12D; however, FIG. 13 also depicts the presence of an account or system switcher 1300. In at least one embodiment, the account switcher 1300 is also available within various other tabs, such as the overview tab, the music tab, the users tab, and the setting tab. The account switcher 1300 may provide an end user a convenient way to separate multiple different accounts or organizations from each other. For example, the end user may be a business owner who owns multiple different businesses. For instance, the business owner may own a chain of restaurants and a chain of car dealers. For a variety of different reasons, the business owner may wish to have separate dashboard accounts for the restaurants and the car dealers. Separate accounts may make managing permissions simpler, managing settings simpler, and/or in some cases managing costs of music services simpler.

In some aspects, different businesses may correspond to different media playback systems, so switching between businesses can be done by changing to different media playback systems. For example, "Company 1" may be a first media playback system, and "Company 2" may be a second media playback system. As such, changing between Company 1 and Company 2 changes the media playback systems that the dashboard user interface 700f displays and provides control of. For example, in response to a change from Company 1 to Company 2, dashboard user interface can request information from the cloud for media playback systems of Company 2 and update the user interface to display information (e.g., location information, playback device(s)) and status (e.g., online, offline, media playback) for Company 2.

FIG. 14 depicts another dashboard user interface 700f in accordance with aspects of the disclosed technology. The dashboard user interface 700f of FIG. 14 is the same dashboard user interface 700f depicted in FIG. 13; however, FIG. 14 also depicts and displays information relating to the account that the user is currently operating within. Dashboard user interface 700f may appear after user selects an associated button, or interface element, in dashboard user interface 700f.

FIG. 15 depicts another dashboard user interface 700g in accordance with aspects of the disclosed technology. Dashboard user interface 700g appears when a user selects the subscription in dashboard user interface 700f and comprises a subscription management page that allows a user to review and/or change various aspects of the user's subscription. For example, dashboard user interface 700g may show the user the current price of their subscription, the current term of the subscription, the total number of available and taken seats in the subscription, and various other similar related items. In at least one embodiment, a user may also be able to cancel, renew, or change their subscription within the dashboard user interface 700g.

Figure 16A:
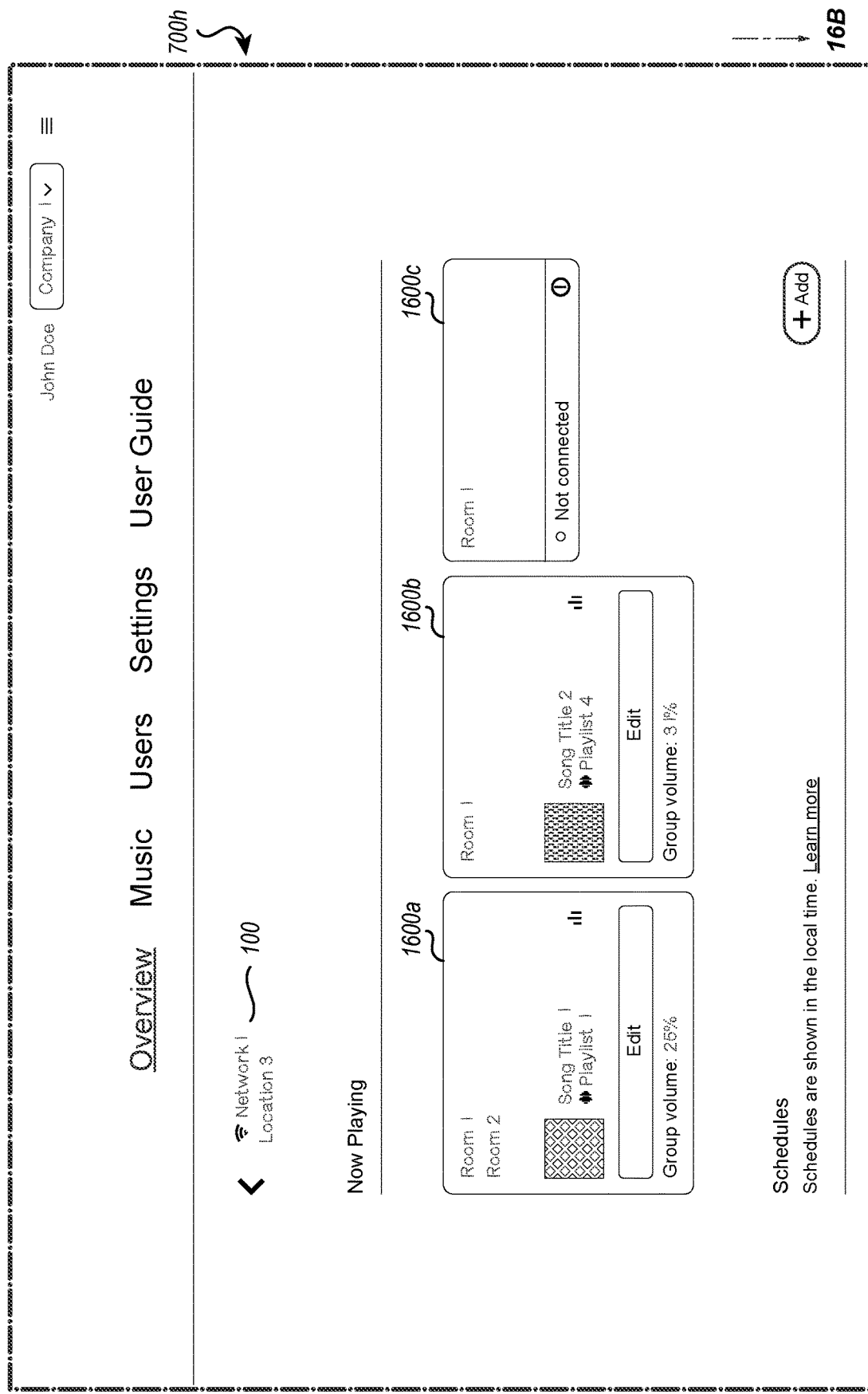
FIGS. 16A-16B depict another dashboard user interface in accordance with aspects of the disclosed technology.
Figure 16B:
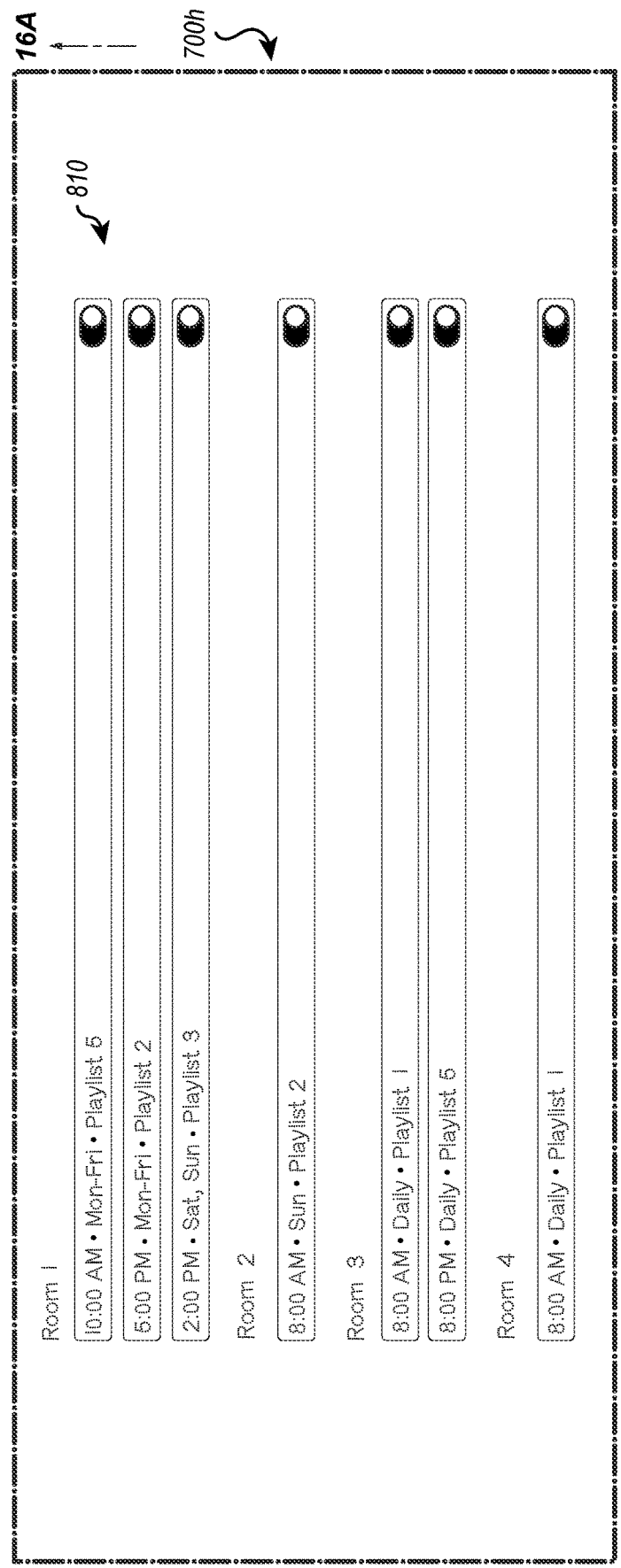

FIGS. 16A-16B depict another dashboard user interface 700h in accordance with aspects of the disclosed technology. Dashboard user interface 700h may be accessed from dashboard user interface 700*a* when a user selects a particular media playback system 100. For example, dashboard user interface 700*h* depicts a media playback system 100 associated with a particular location from dashboard user interface 700*a*. Dashboard user interface 700*h* depicts more detailed information relating to the media playback system 100. For instance, dashboard user interface 700*h* may depict a name or location of the dashboard user interface 700*h* and playback content associated with each room 1600*a*, 1600*b*, 1600*c* within the media playback system 100 and current playback volume of the content. Dashboard user interface 700*h* may also show if a particular room is not connected to the media playback system 100 or is otherwise showing an error (e.g., room 1600*c*). Further, in at least one embodiment, the dashboard user interface 700*h* provides a user with the ability to manage rooms, such as the ability to modify room groupings and the playback devices 110 associated with each room.

Dashboard user interface 700*h* may also show a per-room schedule 810 for the media playback system 100. Accordingly, a user may select a particular location, or media playback system 100, access dashboard user interface 700*h*, and then create, delete, or otherwise change the schedules for playback on the various playback devices within the selected media playback system 100. Each schedule may be set as an individual alarm in the particular room. A description of setting alarms for particular rooms or zones can be found in U.S. Pat. No. 8,483,853 titled "CONTROLLING AND MANIPULATING GROUPINGS IN A MULTI-ZONE MEDIA SYSTEM" and filed on Sep. 11, 2007, which is hereby incorporated by reference.

FIG. 17 depicts another dashboard user interface 700*i* in accordance with aspects of the disclosed technology. In particular, dashboard user interface 700*i* depicts a user interface that appears when a user adds a new schedule item to a schedule 810. For example, dashboard user interface 700*i* may appear after a user selected an option to "add" or otherwise change a schedule 810 in dashboard user interface 700*h*. Dashboard user interface 700*i* provides an interface for manipulating the playback devices 110 on a per-device level, a per-room level, or a per-system level. For example, a user can select specific rooms (also referred to herein as "physical areas") within the audio playback system 100 that the user wishes to schedule. Additionally, the user can set a volume for the playback devices 110. The set volume may be adjustable by individuals within the targeted room(s) or may be unchangeable by anyone without proper permissions. After the user selects "save," each schedule may be stored as a setting in one or more playback devices of the media playback system or in the cloud network 102. At or just before the scheduled time for the location, the playback devices at the location can begin playback and/or the cloud network 102 may transmit a command to the playback device(s) to being playback. The command may include room information, playback information, and identifier information for the media content for playback.

Figure 18B:
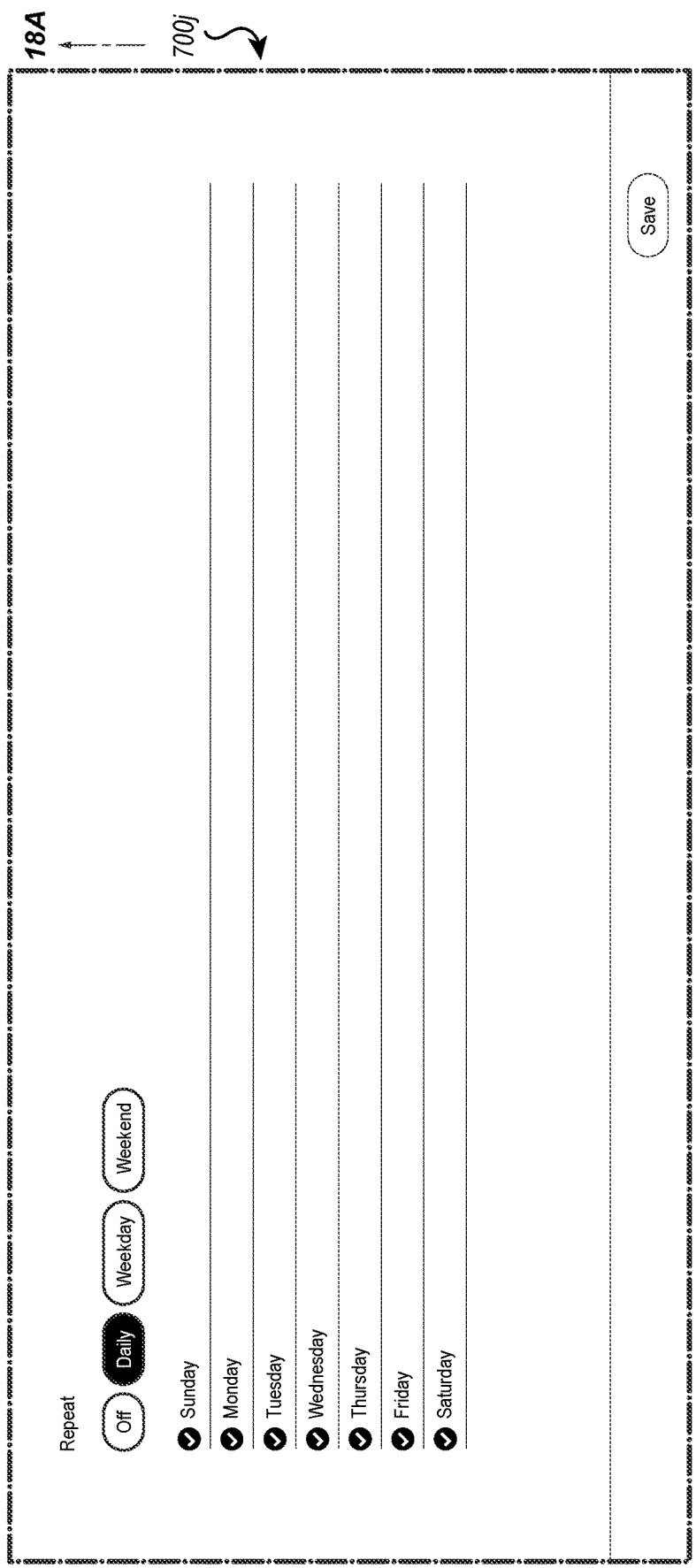

FIGS. 18A-18B depict another dashboard user interface 700*j* in accordance with aspects of the disclosed technology. Dashboard user interface 700*j* relates to dashboard user interface 700*i* and may be accessible by selecting a "time" option that provides a user with options for setting specific schedule times for the devices or rooms selected in dashboard user interface 700*i*. Dashboard user interface 700*j* may provide options for selecting a duration of a schedule, setting up a repeat schedule, or various other conventional scheduling aspects.

Figure 19A:
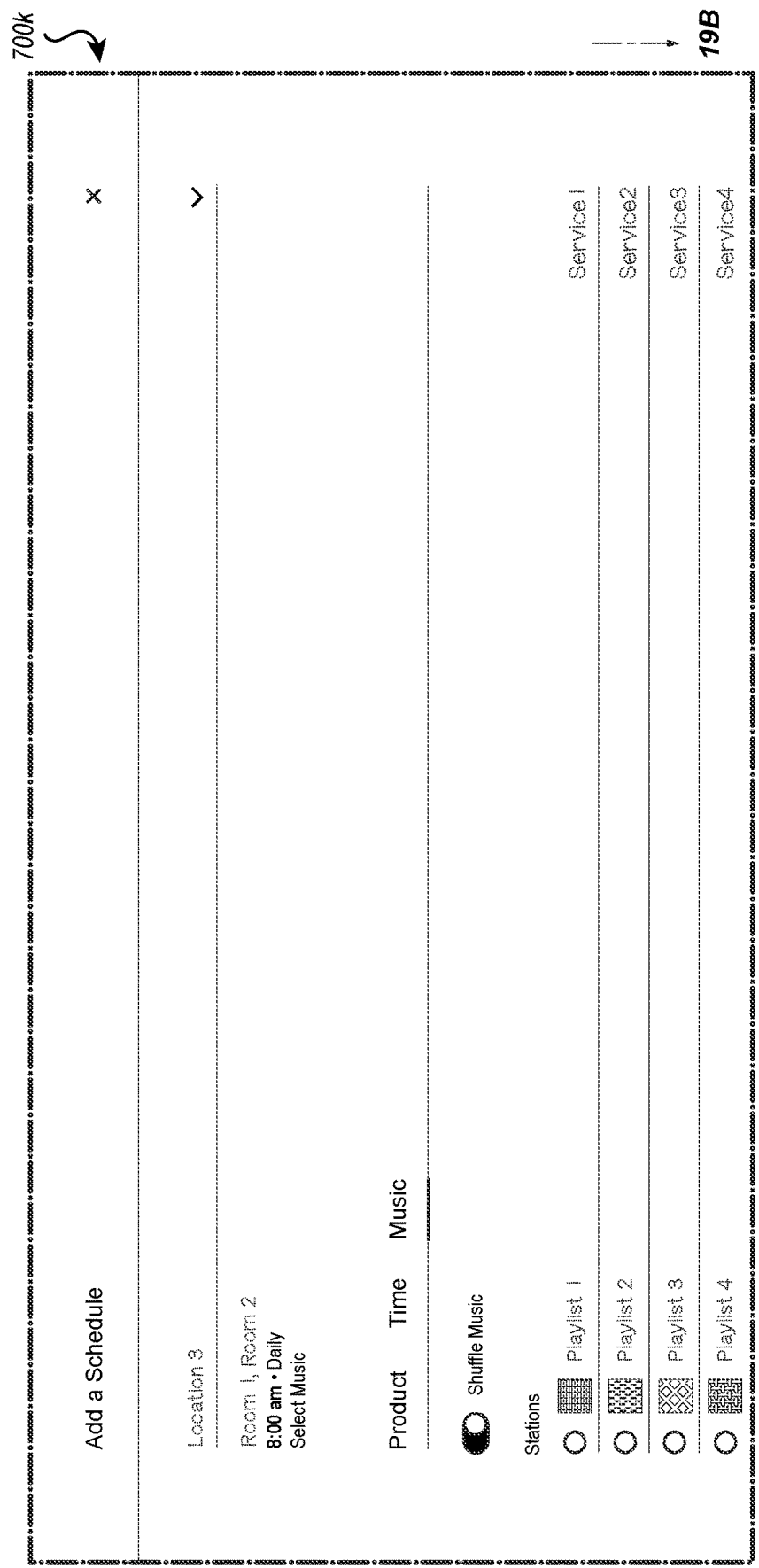
FIGS. 19A-19B depict another dashboard user interface in accordance with aspects of the disclosed technology.
Figure 19B:
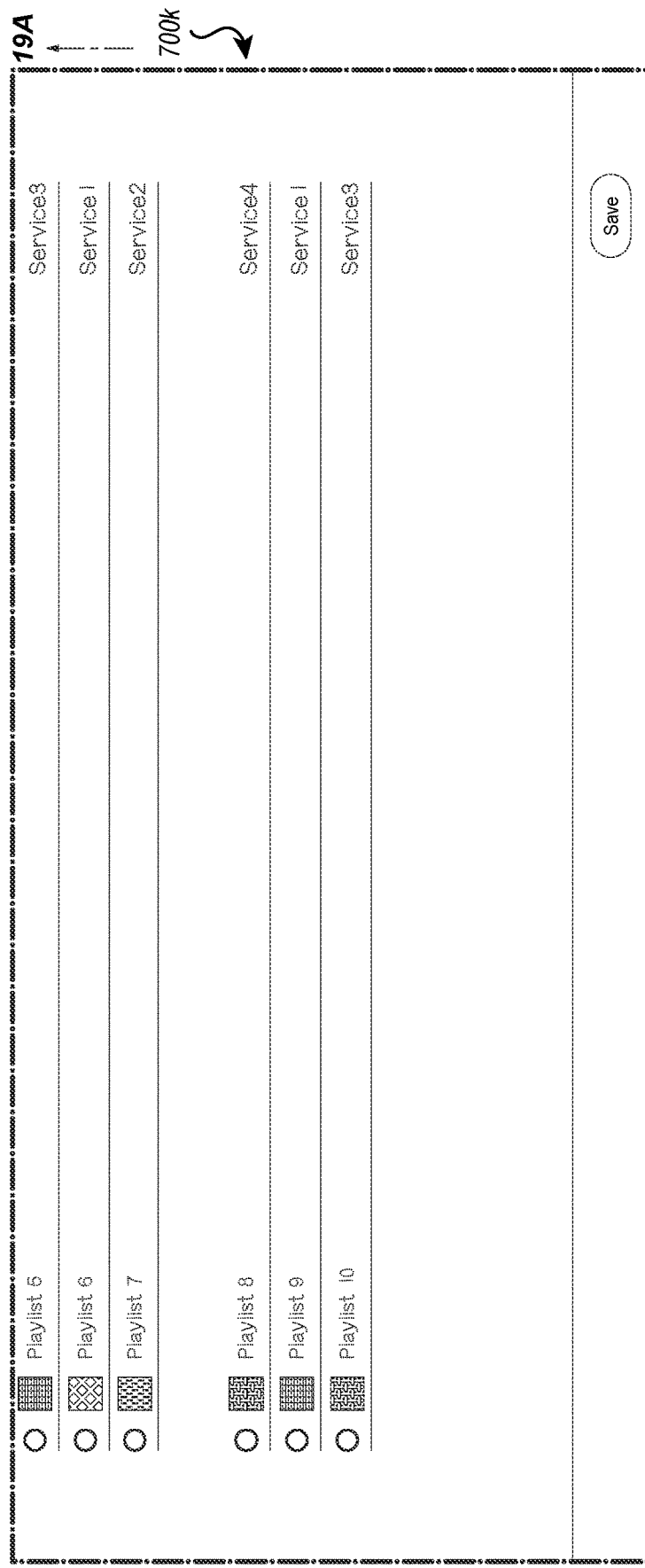

FIGS. 19A-19B depict another dashboard user interface 700*k* in accordance with aspects of the disclosed technology. Dashboard user interface 700*k* relates to dashboard user interface 700*i* and may be accessible by selecting a "music" option that provides a user with options for setting specific playback content for the devices or rooms selected in dashboard user interface 700*i*. Dashboard user interface 700*k* may provide options for selecting a type of music, a radio station, an album, a playlist, or various other groupings of playback content. The available music may be limited to music content (e.g., playlist(s), song(s), album(s), artist(s)) stored as favorites or music content stored in a particular folder. The use of "favorites" is not meant to be limiting, but instead refers to generic "lists" that are created by one or more users or automatically curated by a computer system and can include media saved to the user's library from the streaming service's catalog.

FIG. 20A depicts another dashboard user interface 700*l* in accordance with aspects of the disclosed technology. Dashboard user interface 700*l* displays an interface for selecting between different audio playback systems 100 or different locations. In at least one embodiment, dashboard user interface 700*l* is accessible by selecting an audio playback system switcher 1900 in dashboard user interface 700*k*. Similar options to switch between audio playback systems 100 may be available within dashboard user interface 700*j* and dashboard user interface 700*i*.

Figure 20B:
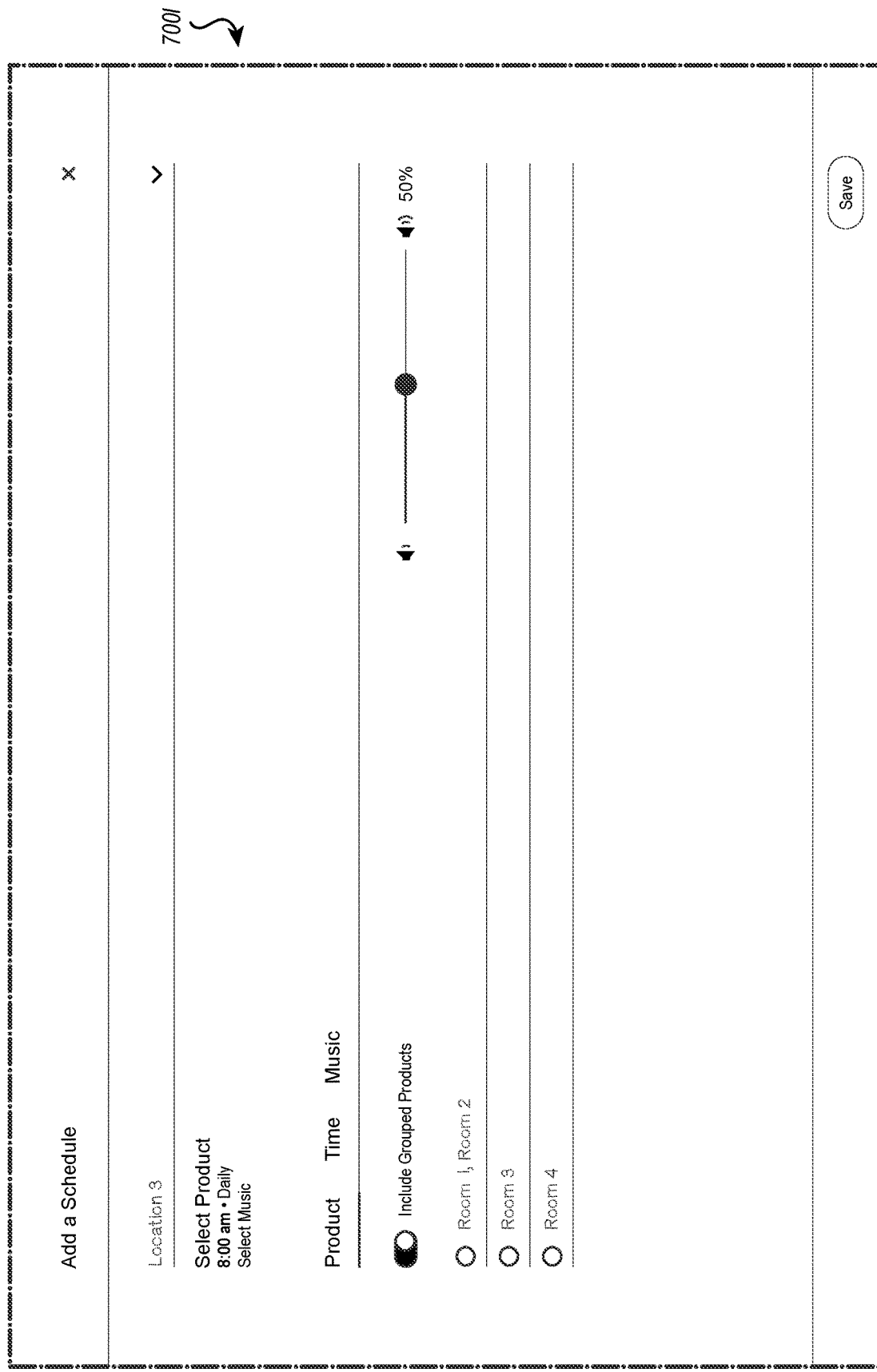
FIG. 20B depicts another dashboard user interface in accordance with aspects of the disclosed technology.

FIG. 20B depicts another dashboard user interface 700*l* in accordance with aspects of the disclosed technology. Dashboard user interface 700*l* is displayed in response to selecting a location in the dashboard user interface 700*l* of FIG. 20A. This interface allows a user to set various settings in regarding to a schedule at the selected location.

Figure 21:
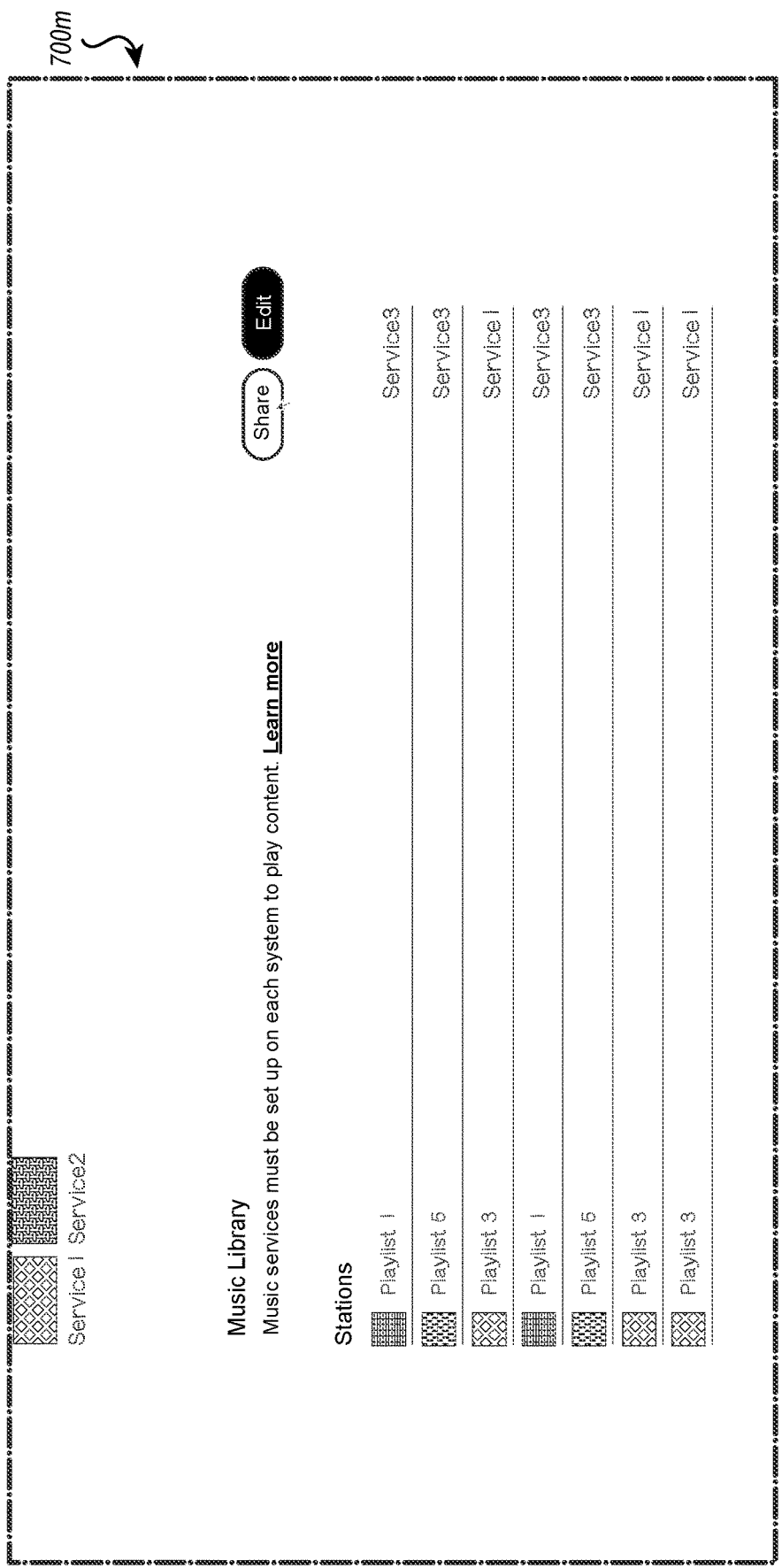
FIG. 21 depicts another dashboard user interface in accordance with aspects of the disclosed technology.

FIG. 21 depicts another dashboard user interface 700*m* in accordance with aspects of the disclosed technology. Dashboard user interface 700*m* shows a portion of dashboard user interface 700*b* from FIG. 8B. Dashboard user interface 700*m* may depict the music library 830 with an associated "share" option 2100. In at least one embodiment, the share option 2100 is configured to share favorites that are associated with the specific playback system 100 that the user is viewing in dashboard user interface 700*m* with another playback system 100 at another location.

Figure 22:
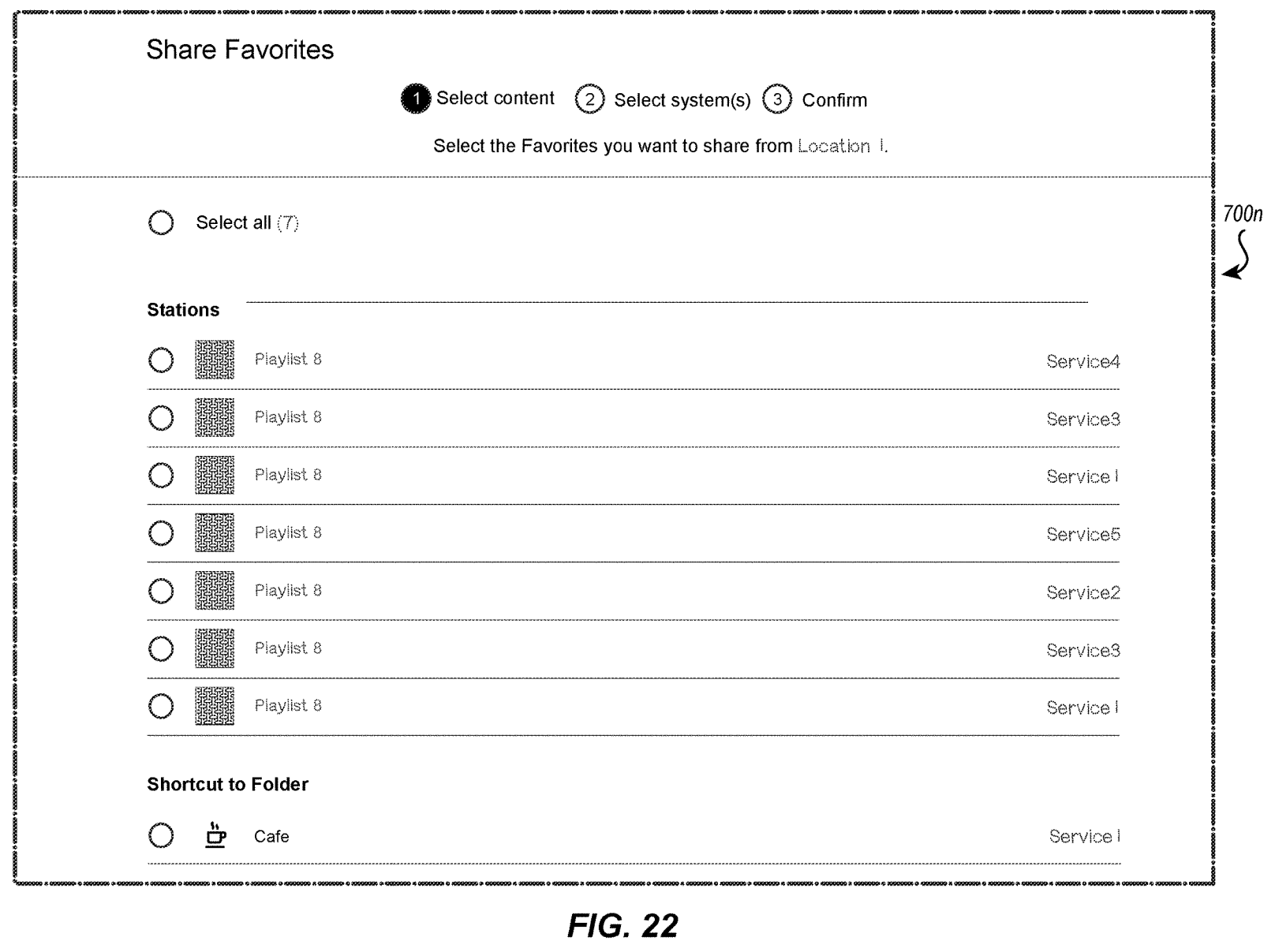

FIG. 22 depicts another dashboard user interface 700*n* in accordance with aspects of the disclosed technology. Dashboard user interface 700*n* may appear in response to a user selecting the "share" option 2100 in dashboard user interface 700*l*. In at least one embodiment, dashboard user interface 700*n* provides a user with the ability to share playback content, settings, and various other data with various other playback systems 100 that are associated with the dashboard user interface 700. By sharing favorites, the user can quickly and easily copy content approved for playback or settings at a particular location to other locations. For example, dashboard user interface 700*n* depicts options for selecting playback content that is associated with the first playback system 100. The displayed playback content may comprise music services, radio stations, playlists, folders of content, or any other form of playback content. The system may limit playback content available for selection to only content saved in the music library or folder (e.g., "Cafe" folder) associated with the present account or system or to content available to other systems. The music library can be obtained from the first playback system or from data stored in the cloud. After selecting content or a folder to share to another location, the displayed interface may proceed from dashboard user interface 700n to 700o where the user can select locations to share the selected content or settings to.

Figure 23A:
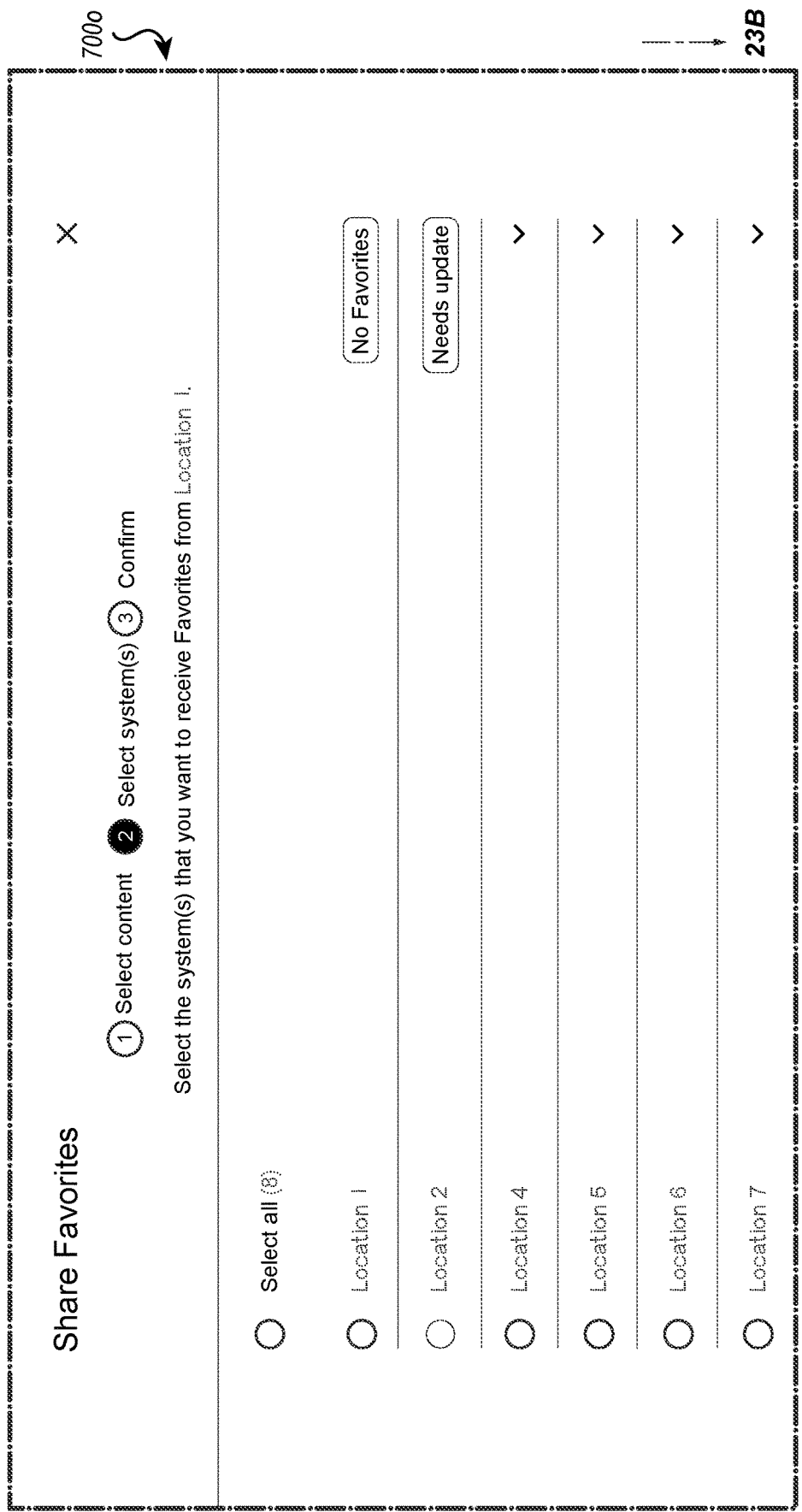
FIGS. 23A-23B depict another dashboard user interface in accordance with aspects of the disclosed technology.
Figure 23B:
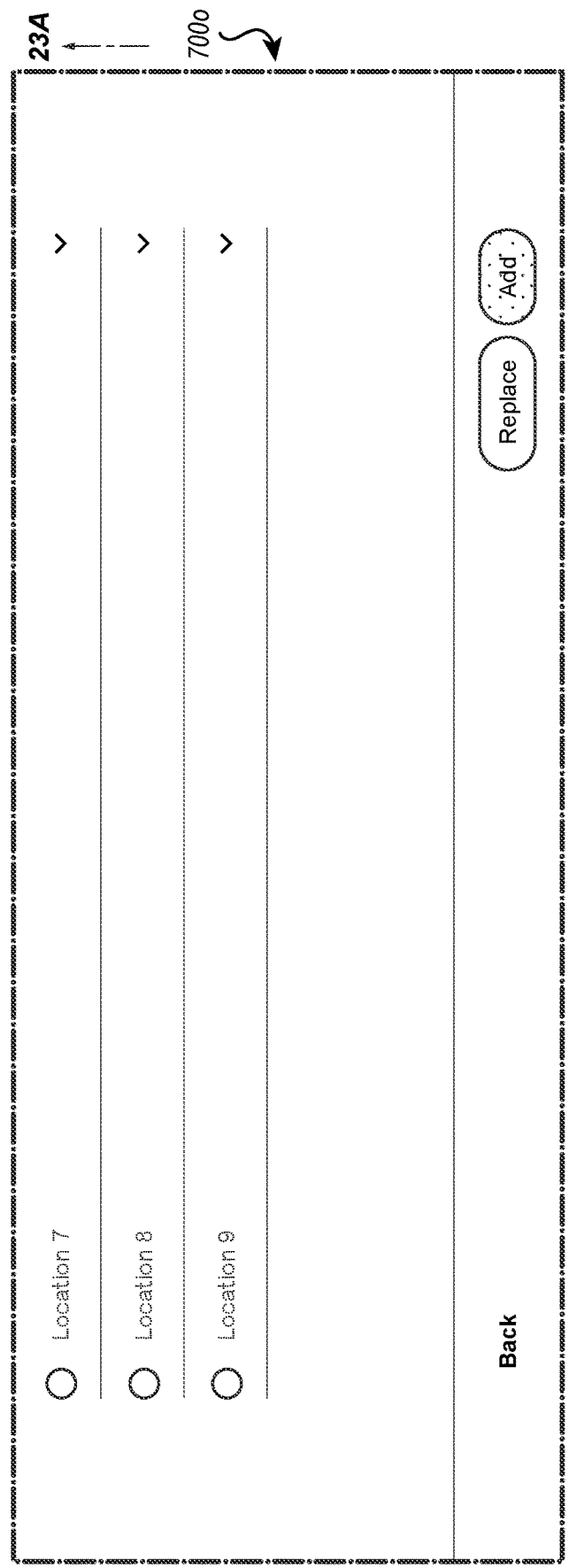

FIGS. 23A-23B depicts another dashboard user interface 700o in accordance with aspects of the disclosed technology. Dashboard user interface 700o may comprise a user interface that is displayed after a user submits the playback content selections from dashboard user interface 700m. Dashboard user interface 700o displays various playback systems 100 (or locations) that are available within the dashboard user interface 700. Additionally, dashboard user interface 700n may display information about each respective playback system 100, such as information about the update status of one or more devices within the playback system, information about the presence of one or more previously shared favorites, and various other information relating to the sharing of information to the playback systems 100. A user is able to select a combination of the various playback systems 100 (or locations) that are available within the dashboard user interface 700. The shared favorites can be added to content available for playback at the particular location (e.g., Location 1, Location 2, etc.) or can replace the content presently available for playback at the particular location. If a location is offline or unavailable for sharing to, dashboard user interface 700o may display an indication that the particular is unavailable. In the example illustrated in FIG. 23A, "Location 2" is shown with an offline indicator of "needs update," and "Location 2" is unavailable for selection. Location 2 may require a software update before normal functions are made available for use or control.

Figure 24A:
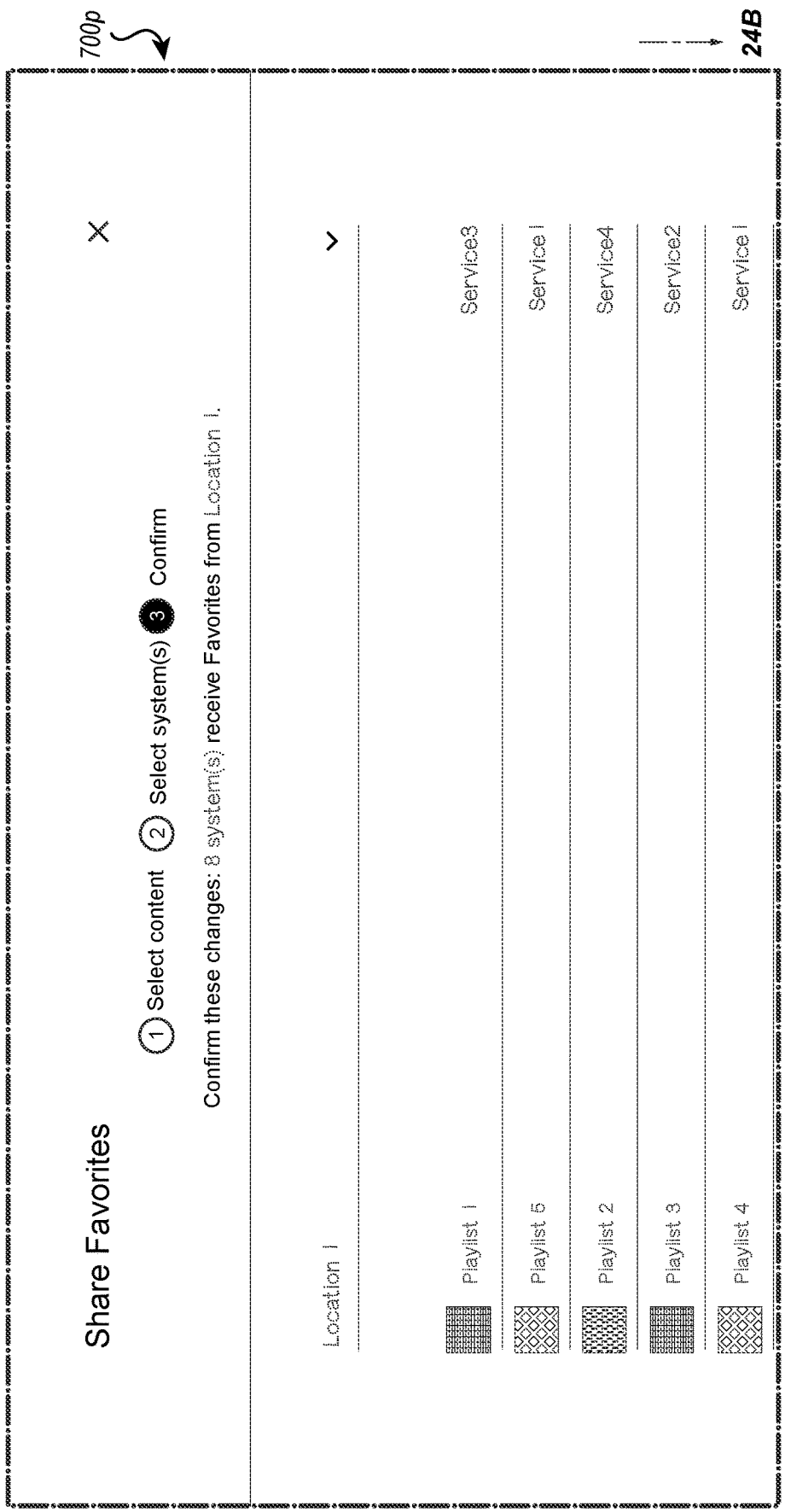
FIGS. 24A-24B depict another dashboard user interface in accordance with aspects of the disclosed technology.
Figure 24B:
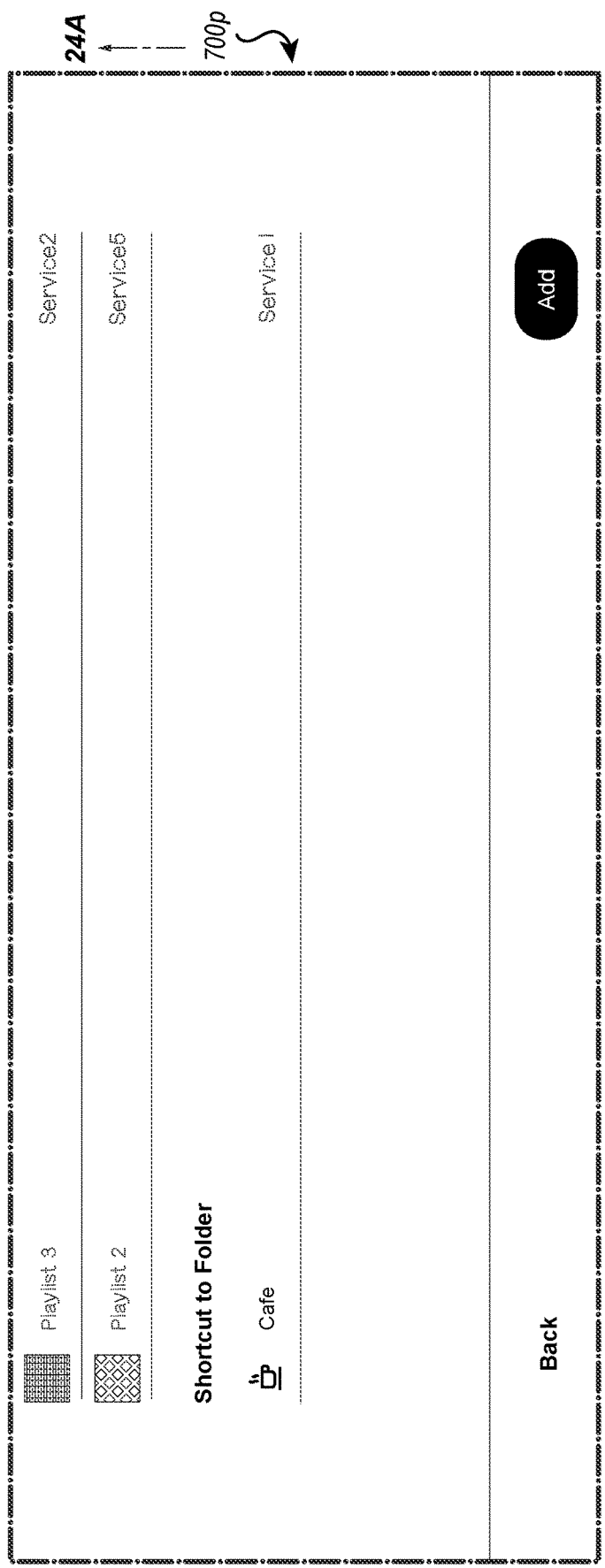

FIGS. 24A-24B depict another dashboard user interface 700p in accordance with aspects of the disclosed technology. Dashboard user interface 700p may comprise a user interface that is displayed after a user submits a selection of playback systems 100 from dashboard user interface 700n. Dashboard user interface 700o provides a screen that summarizes the previously selected share options and provides a user with an option to submit the selections to the dashboard user interface system 700. Once submitted, the system 700 can transmit the selections to the playback system and/or to the cloud to store in the favorites associated with the particular location.

Figure 25:
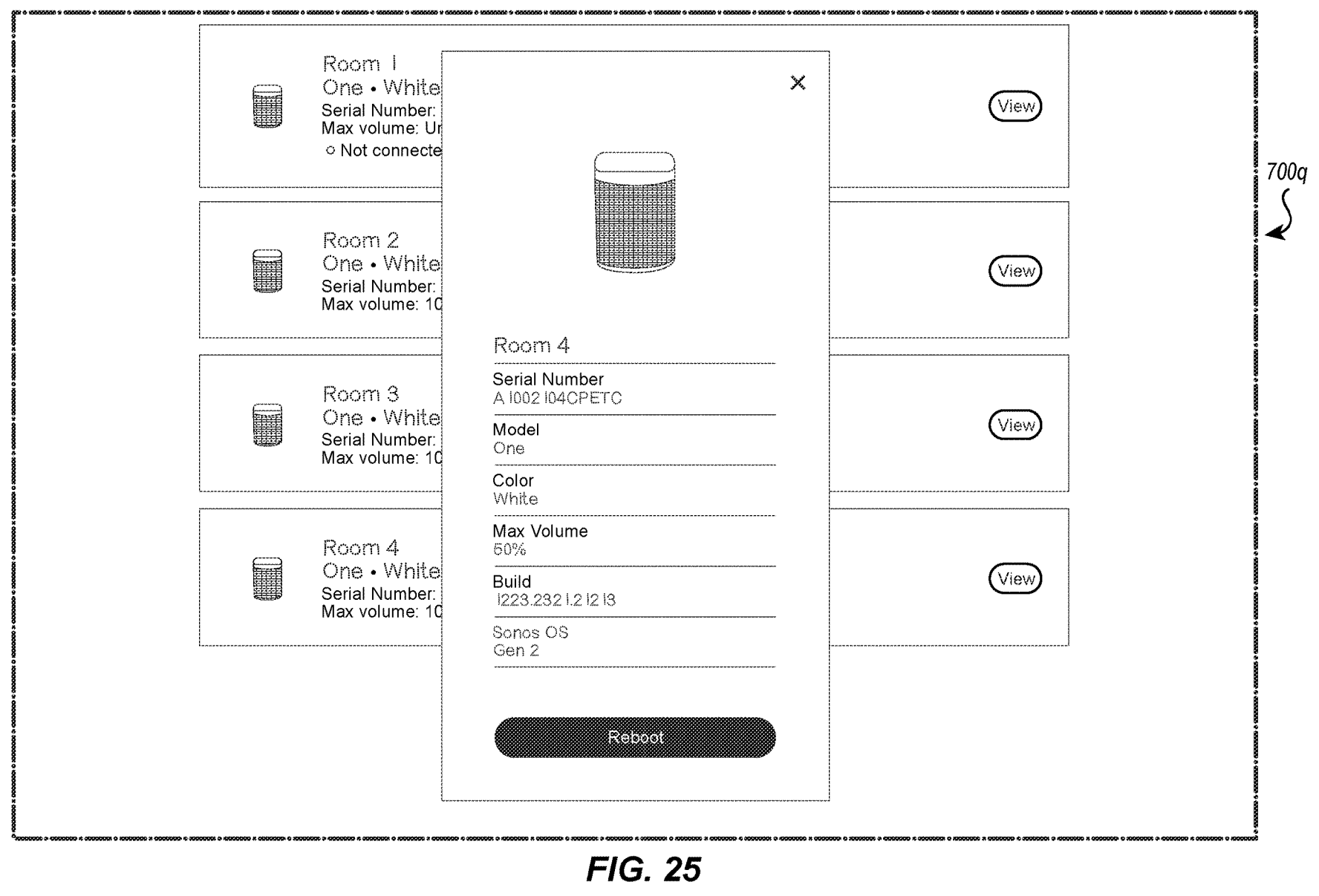

FIG. 25 depicts another dashboard user interface 700q in accordance with aspects of the disclosed technology. Dashboard user interface 700q may be accessible through dashboard interface 700h. In particular, a user may be able to view each playback device 110 that is present within a given playback system 100. The dashboard user interface 700q may provide information about each playback device 119, such as an update status of each playback device, a current playback status of each playback device, a volume level of each playback device and other similar related information. A user may be able to select an individual device to get more detailed information about the selected device. Additionally, the user may be able to reboot, update, or shutdown the selected device from dashboard user interface 700q. In response to a selection, the system can transmit the selected command via a network to the selected playback device.

Figure 26:
FIG. 26 depicts another dashboard user interface in accordance with aspects of the disclosed technology.

FIG. 26 depicts another dashboard user interface 700r in accordance with aspects of the disclosed technology. Dashboard user interface 700r may be accessible from dashboard user interface 700h. For example, a user may be able to navigate to the music library portion 830 of dashboard user interface 700b and select an option to edit favorites. Such a selection may cause dashboard user interface 700r to display. Dashboard user interface 700r provides a user with options for removing or adding particular audio content from a favorites list for a given playback system 100 that is associated with the dashboard user interface 700r.

FIG. 27 depicts another dashboard user interface 700s in accordance with aspects of the disclosed technology. Dashboard user interface 700s provides a user with the ability to import favorites or share favorites from another playback system 100 that is associated with the dashboard user interface 700. For example, dashboard user interface 700r may provide a user interface option for a user to import favorites. Selecting such an option may cause dashboard user interface 700s to be displayed. Dashboard user interface 700s displays various playback systems, or locations, that a user can choose to import favorites from. Submitting the request to import favorites can cause the system to send a command to the cloud or a playback device to obtain favorites of other playback systems or locations and apply or add them as favorites for the playback system 100.

FIG. 28 depicts another dashboard user interface 700t in accordance with aspects of the disclosed technology. Dashboard user interface 700t may be accessible after a user submits a selection of playback systems 100 in dashboard user interface 700s. Dashboard user interface 700t displays a listing of audio content that a user can select to import from the location(s) selected in dashboard user interface 700r.

Figure 29:
FIG. 29 depicts another dashboard user interface in accordance with aspects of the disclosed technology.

FIG. 29 depicts another dashboard user interface 700u in accordance with aspects of the disclosed technology. Dashboard user interface 700u displays a final page to save options that were selected in dashboard user interface 700s and dashboard user interface 700t.

Figure 30:
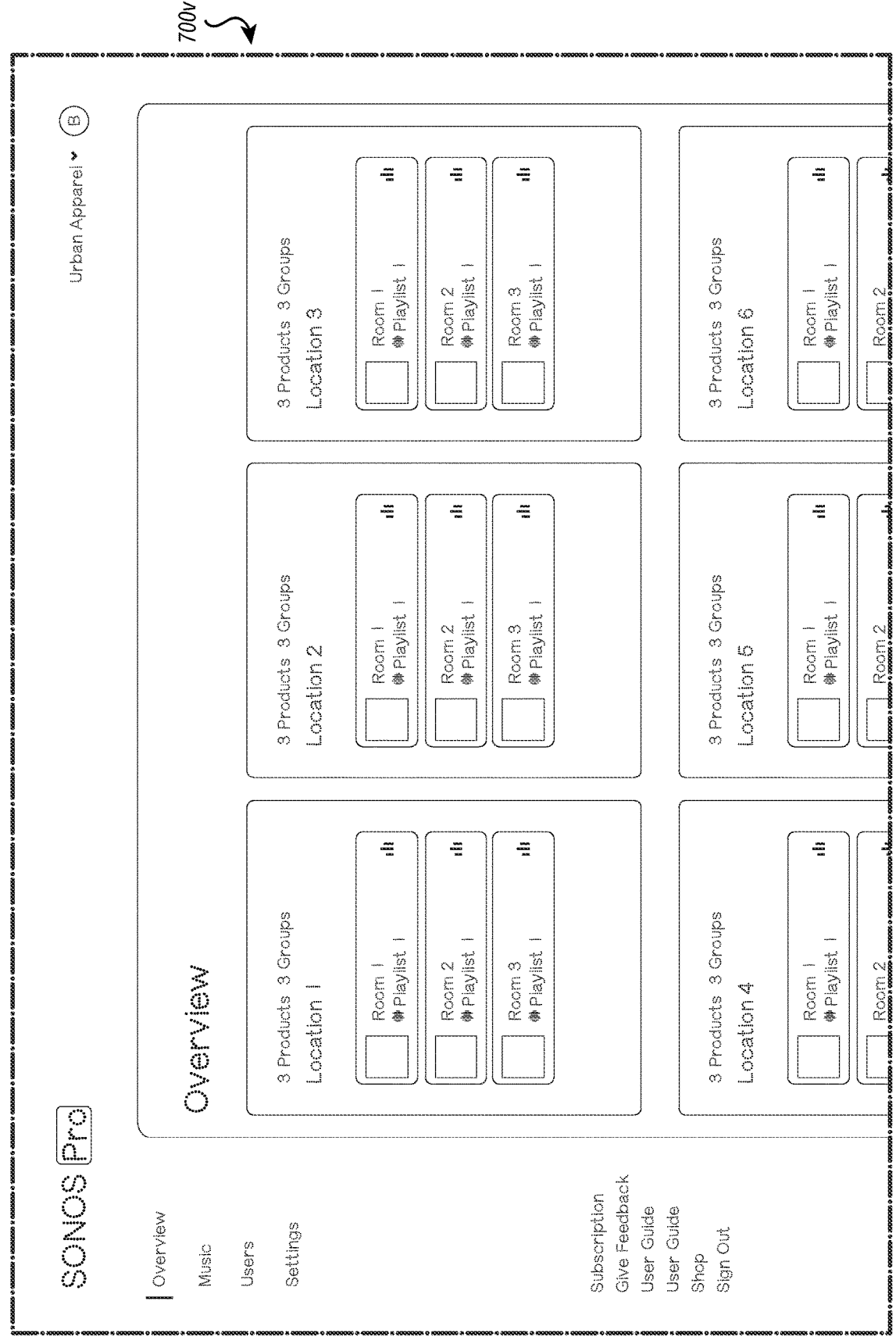
FIG. 30 depicts another dashboard user interface in accordance with aspects of the disclosed technology.

FIG. 30 depicts another dashboard user interface 700v in accordance with aspects of the disclosed technology. Dashboard user interface 700v displays a page similar to dashboard user interface 700a, except dashboard user interface 700v includes a tab bar 710 on the side of the display whereas dashboard user interface 700a includes the tab bar on the top of the display. One can appreciate that the other dashboard user interfaces 700 shown herein can be adapted to the dashboard user interface 700v of FIG. 30 by moving the tab bar 710 to the side of the display.

In at least one embodiment, dashboard user interfaces 700a or 700v may also display information about playback content that is playing at various given locations. For example, dashboard user interface 700a or 700v may receive an indication that a particular location 100a is playing particular audio content in response to a scheduled playlist. The indication may be received through a network communication from a cloud network 102. The dashboard user interface 700v can display a visual indication that the particular location 100a is currently playing the scheduled particular audio content. As such, a user may be able to view the current content playing at each location, including scheduled content.

Figure 31A:
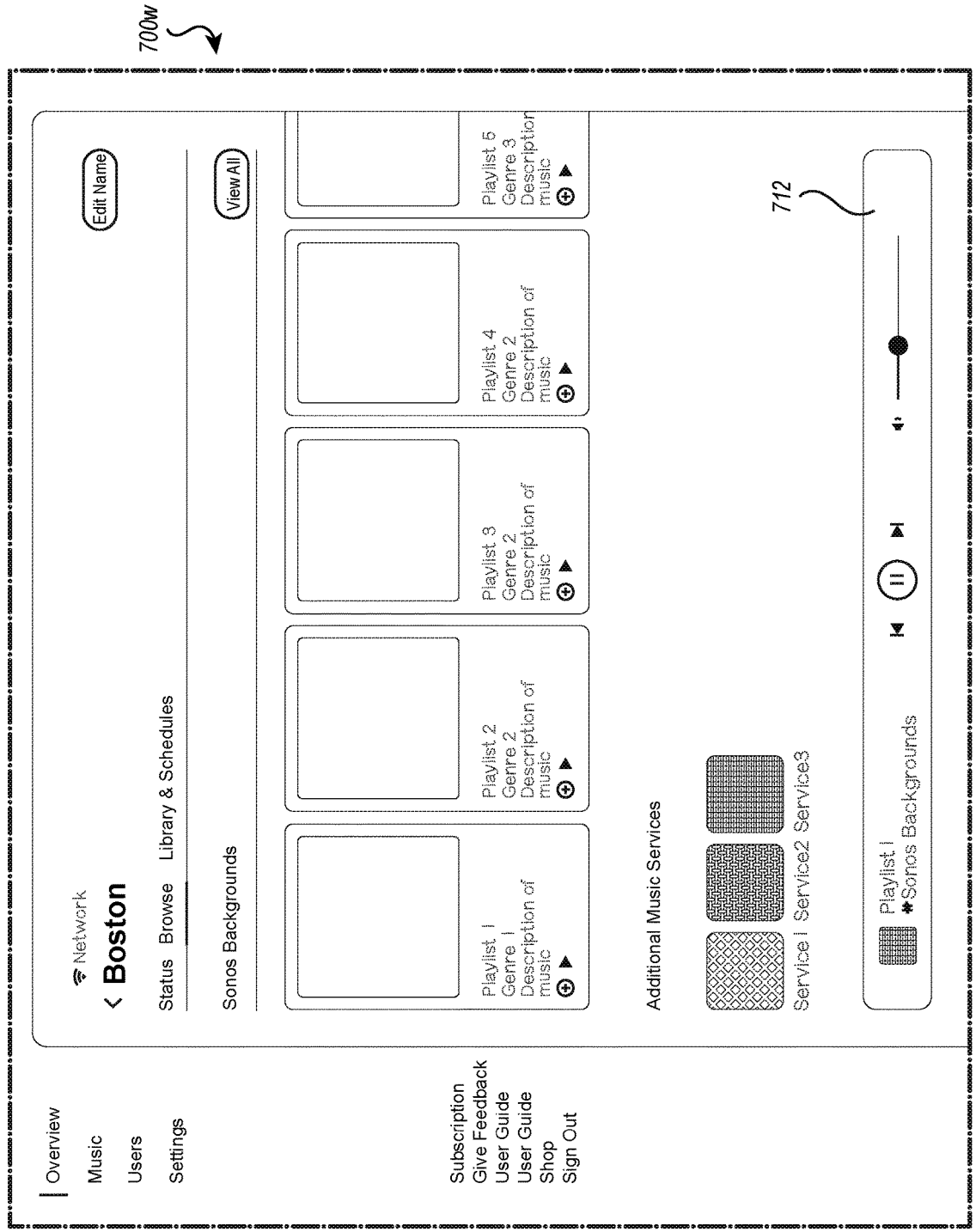
FIGS. 31A-31C depict another dashboard user interface in accordance with aspects of the disclosed technology.
Figure 31B:
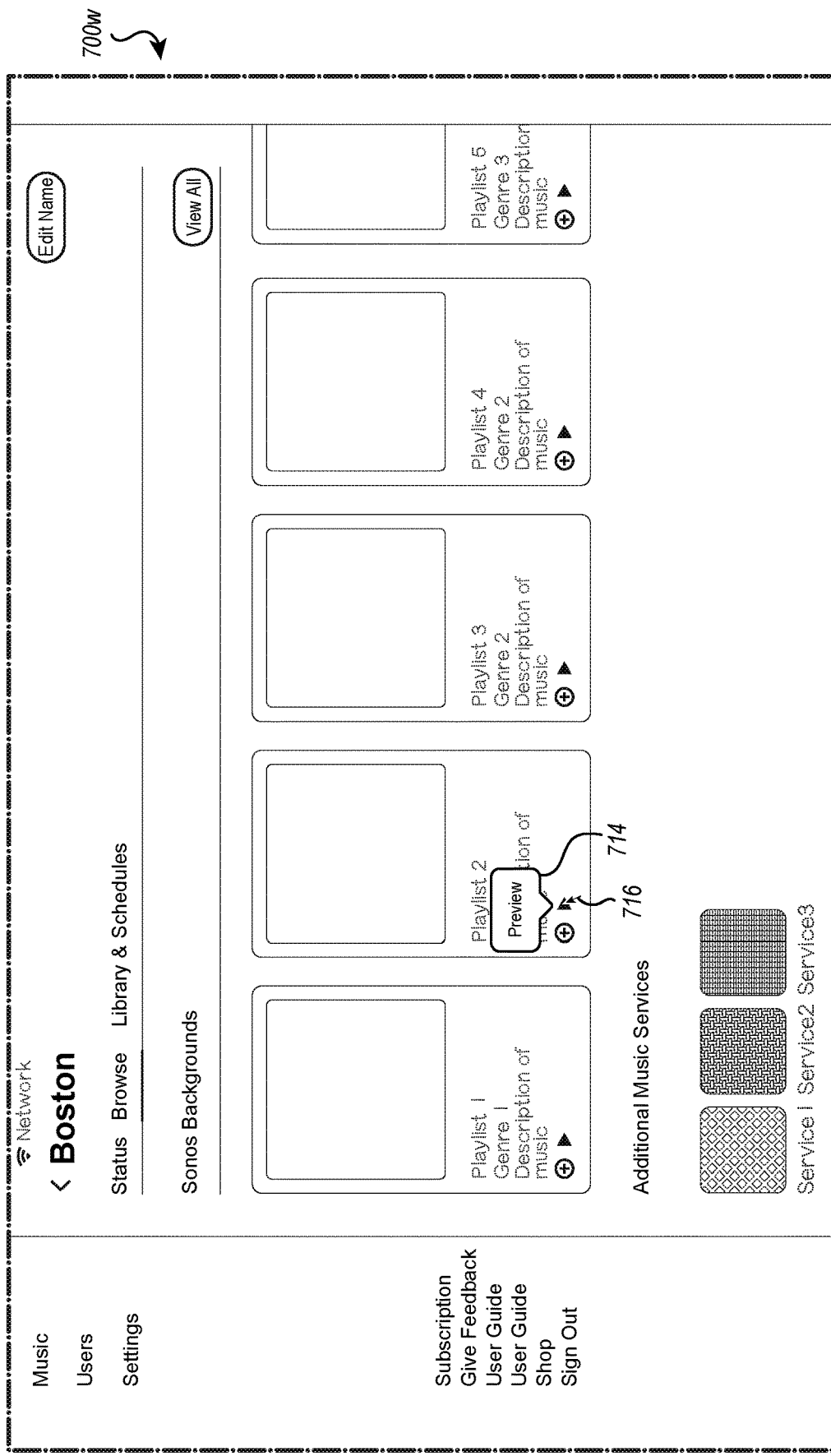
Figure 31C:
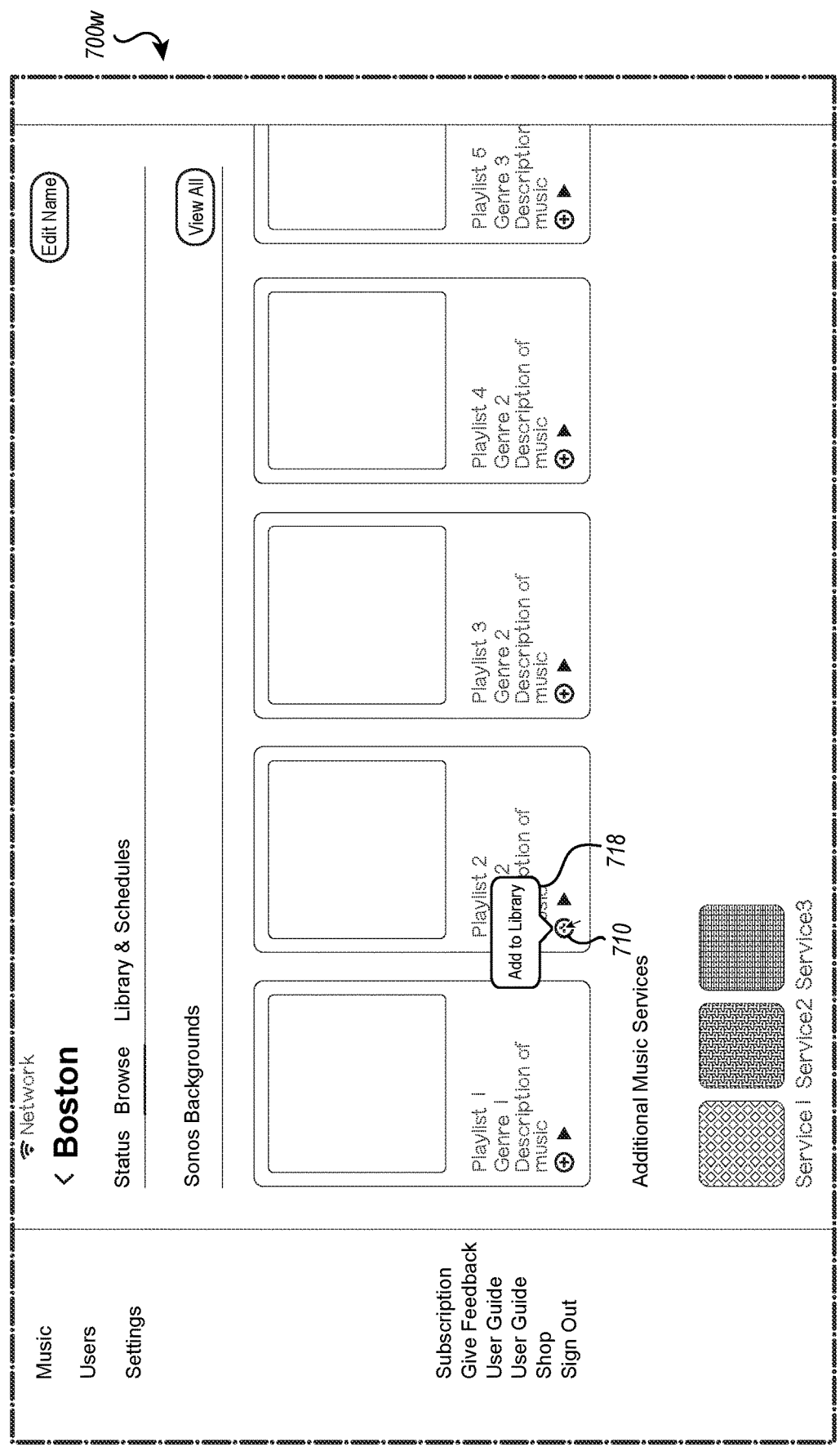

FIGS. 31A-31C depict another dashboard user interface 700w in accordance with aspects of the disclosed technology. Dashboard user interface 700w may comprise a user interface that is displayed in response to a user selecting a location 100c in dashboard user interface 700a. Dashboard user interface 700w provides a screen that allows a user to preview shortened clips of songs on a radio station. For example, dashboard user interface 700w provides a music bar 712 that allows a user to listen to clips (e.g., 30-second clips) of songs on a particular radio station. For instance, a user may select an "easy listening radio station" and listen to several 30-second clips of a song to determine if the user likes the general themes, energy, and music selections of the station. The user is also able to skip between music clips in order to more quickly sample a station's playlist. One will appreciate that the 30-second clips are provided only for the sake of example and explanation. Any number of different clip lengths can be used and remain within the scope of this disclosure. FIG. 31B depicts a cursor prompt 714 stating "Preview" in response to the mouse hovering over a preview button 716. The music bar 712 may appear after the user selects the preview button 716. After playback of the preview is completed or is paused, the music bar 712 may no longer be displayed, and may reappear after the user selects the preview button 716. FIG. 31C depicts a cursor prompt 718 stating "Add to Library" in response to the mouse hovering over an add button 720. Selecting the add button will add the selected radio station or playlist to the locations song lists. The system may retrieve the individual tracks of the radio station using addresses or other identifiers (e.g., URI, URL, etc.) and limit playback to the clip for playback, and automatically proceed to the next track for preview once playback of the current clip is completed. After the user has previewed all of the individual tracks of the radio station, the dashboard may return and preview from the beginning of the radio station. The genre or description of the music may be metadata that is associated with the radio station.

Accordingly, disclosed embodiments describe a detailed dashboard user interface 700 that a user can navigate and utilize to monitor and control multiple playback systems 100 that are spread across multiple locations. Such control allows the user to ensure compliance with desired rules and policies, while also allowing the user to share limited permissions with other individuals. For example, a business owner can establish and enforce company policies relating to the playback of audio within throughout their company, while also allowing local employees some control over the audio playback.

Figure 32:
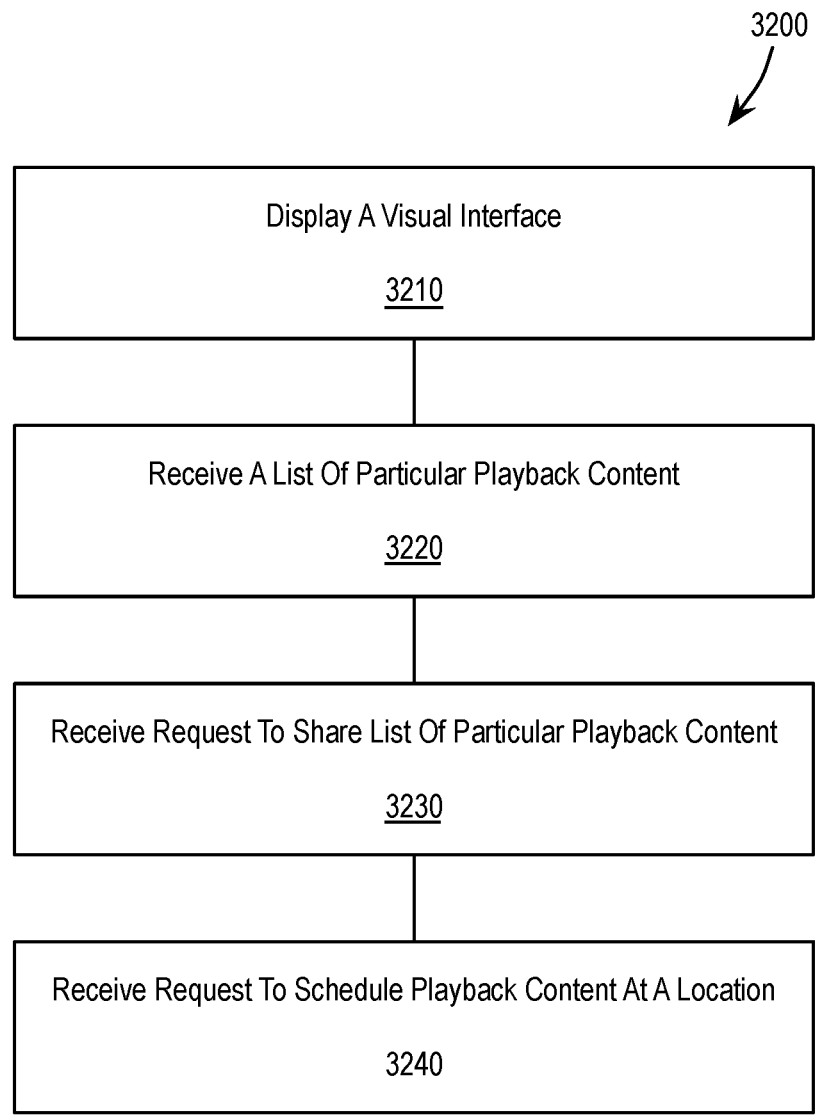
FIG. 32 depicts a flowchart for a method for rendering a controller interface in accordance with aspects of the disclosed technology.

Disclosed embodiments also include various methods for monitoring and controlling multiple playback systems 100 that are spread across multiple locations. For example, FIG. 32 depicts a flowchart for a method 3200 for rendering a controller interface. Method 3200 includes an act 3210 of displaying a visual interface. Act 3210 comprises displaying a visual interface for controlling one or more media playback systems. The one or more media playback systems may be located at different locations. At least one of the one or more media playback systems may comprise multiple playback devices. For example, as depicted and described with respect to FIG. 7A, various locations 100(*a-c*) may be presented on a user interface. The locations may represent different playback systems 100.

Additionally, method 3200 may include an act 3220 of receiving a list of particular playback content. Act 3220 comprises receiving one or more first user inputs associating a list of particular playback content with a first location selected from the different locations. The list of particular playback content may comprise a favorites list prepared for the first location. The favorites list may be manually generated by one or more users or may be automatically generated based upon playback content that is frequently played at the first location. Method 3200 also includes an act 3230 of receiving a request to share a list of particular playback content. Act 3230 comprises receiving one or more second user inputs sharing the list of particular playback content with a second location selected from the different locations. For example, as depicted and described with respect to FIGS. 26 and 27, various options for importing or sharing favorites are provided. A user may be able to select a list of particular media playback content (e.g., a favorites list) from a first location and share that list with a second location.

In addition, method 3200 may include an act 3240 of displaying a schedule interface, wherein the schedule interface displays options for scheduling particular locations to play particular audio content. The computer system can receive, through the schedule interface, one or more third user inputs scheduling the list of particular playback content to play at the second location at a scheduled time. For example, a user may be able to schedule the list of particular playback content to play during a morning time at the second location.

Figure 33:
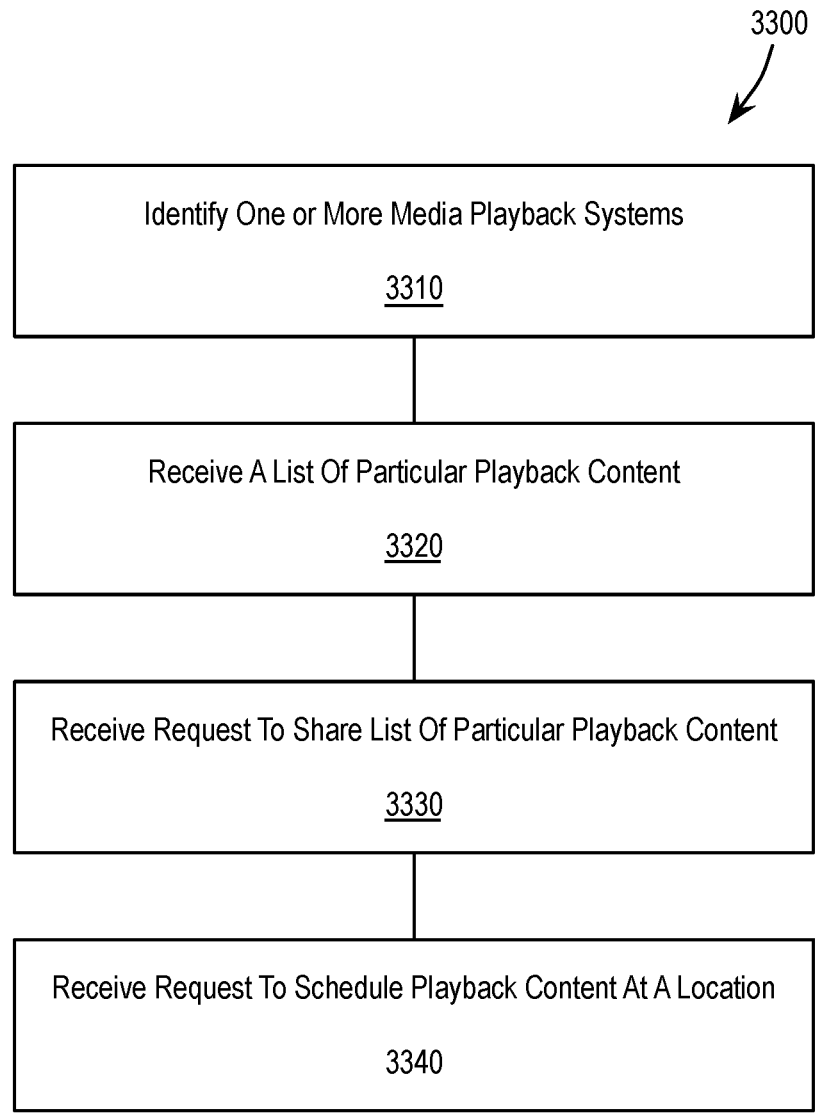
FIG. 33 depicts a flowchart for a method for controlling playback systems in accordance with aspects of the disclosed technology.

Further disclosed embodiments include various methods for monitoring and controlling multiple playback systems 100 that are spread across multiple locations. For example, FIG. 33 depicts a flowchart for a method 3300 for controlling one or more media playback systems. Method 3300 may describe a method performed by a cloud network 102. Method 3300 includes an act 3310 of identifying one or more media playback systems. Act 3310 comprises identify one or more media playback systems that are associated with a common user account. The one or more media playback systems may be located at different locations. At least one of the one or more media playback systems may comprise multiple playback devices. For example, as depicted and described with respect to FIG. 7A, various locations 100(*a-c*) may be presented on a user interface. The locations may represent different playback systems 100.

Additionally, method 3300 may include an act 3320 of receiving a list of particular playback content. The list of particular playback content may comprise a favorites list as described herein. Act 3320 comprises receiving a list of particular playback content associated with a first location selected from the different locations. Method 3300 also includes an act 3330 of receiving a request to share a list of particular playback content. Act 3330 comprises receiving a request to share the list of particular playback content with a second location selected from the different locations. For example, as depicted and described with respect to FIGS. 26 and 27, various options for importing or sharing favorites are provided.

In addition, method 3300 may include an act 3340 of receiving a request to schedule playback content at a location. Act 3340 comprises receiving a schedule for causing the list of particular playback content to play at the second location at a scheduled time. For example, the computer system can receive, from a schedule interface, one or more third user inputs scheduling the list of particular playback content to play at the second location at a scheduled time.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computer system for executing a controller interface for communicating to different networks, comprising:
   one or more processors; and
   one or more computer-readable media having stored thereon executable instructions that when executed by the one or more processors configure the computer system to:
      display a visual interface for controlling a plurality of media playback systems, wherein:
         the plurality of media playback systems and said networks associated with each of the plurality of media playback systems are each located at different physical buildings, and
         at least one of the plurality of media playback systems comprises multiple playback devices;
      receive one or more first user inputs associating a list of particular playback content with a first physical building selected from the different physical buildings;
      receive one or more second user inputs sharing the list of particular playback content with a second physical building selected from the different physical buildings;
      display a schedule interface, wherein the schedule interface displays options for scheduling particular physical buildings to play particular audio content;
      receive, through the schedule interface, one or more third user inputs scheduling the list of particular playback content to play at the first physical building and the second physical building at a scheduled time; and
      receive, through the schedule interface, one or more fourth user inputs setting a particular volume level on a per-system level of the plurality of media playback systems.

2. The controller interface of claim 1, wherein the executable instructions that are executable by the one or more processors such that the controller interface is configured to display the schedule interface are further executable by the one or more processors such that the controller interface is configured to display options for scheduling subsets of the multiple playback devices to play playback content at the second physical building.

3. The controller interface of claim 2, wherein a first subset of the multiple playback devices is associated with a first physical area of the second physical building and a second subset of the multiple playback devices is associated with a second physical area of the second physical building.

4. The controller interface of claim 3, wherein the executable instructions that are executable by the one or more processors such that the controller interface is configured to display the schedule interface are further executable by the one or more processors such that the controller interface is configured to display options for scheduling the list of particular playback content to play at the first physical area and for scheduling different playback content to play at the second physical area.

5. The controller interface of claim 1, wherein the list of particular playback content comprises a favorite list of playback content that is designated by a user.

6. The controller interface of claim 1, wherein the executable instructions that are executable by the one or more processors such that the controller interface is configured to display the schedule interface further comprise executable instructions that are executable by the one or more processors such that the controller interface is configured to display visual information indicating that at least a portion of playback content is available for only a subset of locations selected from the different physical buildings.

7. The controller interface of claim 6, wherein the list of particular playback content comprises playback content that is not available at the second physical building.

8. The controller interface of claim 7, wherein the executable instructions that are executable by the one or more processors such that the controller interface is configured to receive the one or more second user inputs sharing the list of particular playback content with the second physical building selected from the different physical buildings are further executable by the one or more processors such that the controller interface is configured to remove playback content that is not available at the second physical building from the list of particular playback content before sharing the list of particular playback content with the second physical building.

9. The controller interface of claim 1, wherein the one or more computer-readable media further comprise executable instructions that when executed by the one or more processors configure the controller interface to:
   receive, through the schedule interface, one or more fifth user inputs setting an option that is configured to prevent individuals within a target room from changing the particular volume level.

10. A computer system for controlling media playback devices at multiple locations and on different networks, comprising:
  one or more processors; and
  one or more computer-readable media having stored thereon executable instructions that when executed by the one or more processors configure the computer system to:
    identify a plurality of media playback systems that are associated with a common user account, wherein:
      the plurality of media playback systems and said networks associated with each of the plurality of media playback systems are each located at different locations,
      each media playback system comprises one or more playback devices; and
      at least one of the plurality of media playback systems comprises multiple playback devices;
    receive a list of particular playback content associated with a first location selected from the different locations;
    receive a request to share the list of particular playback content with a second location selected from the different locations;
    receive a schedule for causing the list of particular playback content to play at the second location at a scheduled time; and
    receive a setting prohibiting physical line-in access to playback devices within the plurality of media playback systems.

11. The computer system of claim 10, wherein the schedule is configured to cause a selected subset of playback devices at the second location to play the list of particular playback content at the scheduled time.

12. The computer system of claim 11, wherein a first subset of the multiple playback devices is associated with a first physical area of the second location and a second subset of the multiple playback devices is associated with a second physical area of the second location.

13. The computer system of claim 12, wherein the schedule is configured to cause the list of particular playback content to play at the first physical area and to cause different playback content to play at the second physical area.

14. The computer system of claim 10, further comprising executable instructions that are executable by the one or more processors such that the computer system is configured to identify that at least a portion of playback content is available for only a subset of locations selected from the different locations.

15. The computer system of claim 14, wherein the list of particular playback content comprises playback content that is not available at the second location.

16. The computer system of claim 15, further comprising executable instructions that are executable by the one or more processors such that the computer system is configured to remove playback content that is not available at the second location from the list of particular playback content before sharing the list of particular playback content with the second location.

17. A method for controlling media playback devices at multiple locations and on different networks, comprising:
  identifying a plurality of media playback systems that are associated with a common user account, wherein:
    the plurality of media playback systems and said networks associated with each of the plurality of media playback systems are located at different locations,
    at least one location comprises a first room in a first building and a second room in a second building, the first building comprising a first network and the second building comprising a second network; and
    at least one of the plurality of media playback systems comprises multiple playback devices;
  receiving a list of particular playback content associated with the first room within the first building;
  receiving a request to share the list of particular playback content with the second room within the second building; and
  receiving a schedule for causing the list of particular playback content to play at the second room at a scheduled time, wherein the list of particular playback content plays at the second room at a different time than when the list of particular playback content plays at the first room.

* * * * *